(12) United States Patent
Shimizu et al.

(10) Patent No.: US 7,151,792 B2
(45) Date of Patent: Dec. 19, 2006

(54) SPREAD SPECTRUM RAKE RECEIVER

(75) Inventors: Masahiko Shimizu, Kawasaki (JP);
Tsuyoshi Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 745 days.

(21) Appl. No.: 10/116,367

(22) Filed: Apr. 4, 2002

(65) Prior Publication Data
US 2003/0086482 A1 May 8, 2003

(30) Foreign Application Priority Data
Oct. 30, 2001 (JP) .............................. 2001-332510

(51) Int. Cl.
*H04B 1/707* (2006.01)
*H04B 1/69* (2006.01)

(52) U.S. Cl. ........................ 375/148; 375/147; 375/150

(58) Field of Classification Search ................ 375/147, 375/136, 148, 200, 208, 144, 150, 347, 349; 455/453; 370/335, 342, 441
See application file for complete search history.

(56) References Cited
U.S. PATENT DOCUMENTS
5,812,593 A * 9/1998 Kaku ......................... 375/150
6,026,115 A * 2/2000 Higashi et al. ............. 375/148
6,901,105 B1 * 5/2005 Razzell ....................... 375/148
2003/0092447 A1 * 5/2003 Bottomley et al. ......... 455/453

FOREIGN PATENT DOCUMENTS
JP 08-181636 7/1996

* cited by examiner

*Primary Examiner*—Betsy L. Deppe
(74) *Attorney, Agent, or Firm*—Katten Muchin Rosenman LLP

(57) ABSTRACT

The present invention is provided with a path timing detection unit for detecting path timings of a multi-path; a de-spreading timing setting unit for setting the detected path timings as de-spreading timings, and also for setting as de-spreading timings two timings that are symmetric to the other path timing by setting a delay time between timings of two paths in accordance with respective combinations of two paths of the multi-path on a time axis, while setting a path timing of one path of the two paths as a center; a plurality of correlators for obtaining respective de-spread signals of the reception signals corresponding to the respective set timings; and a signal synthesis unit for synthesizing outputs of the plurality of correlators.

10 Claims, 23 Drawing Sheets

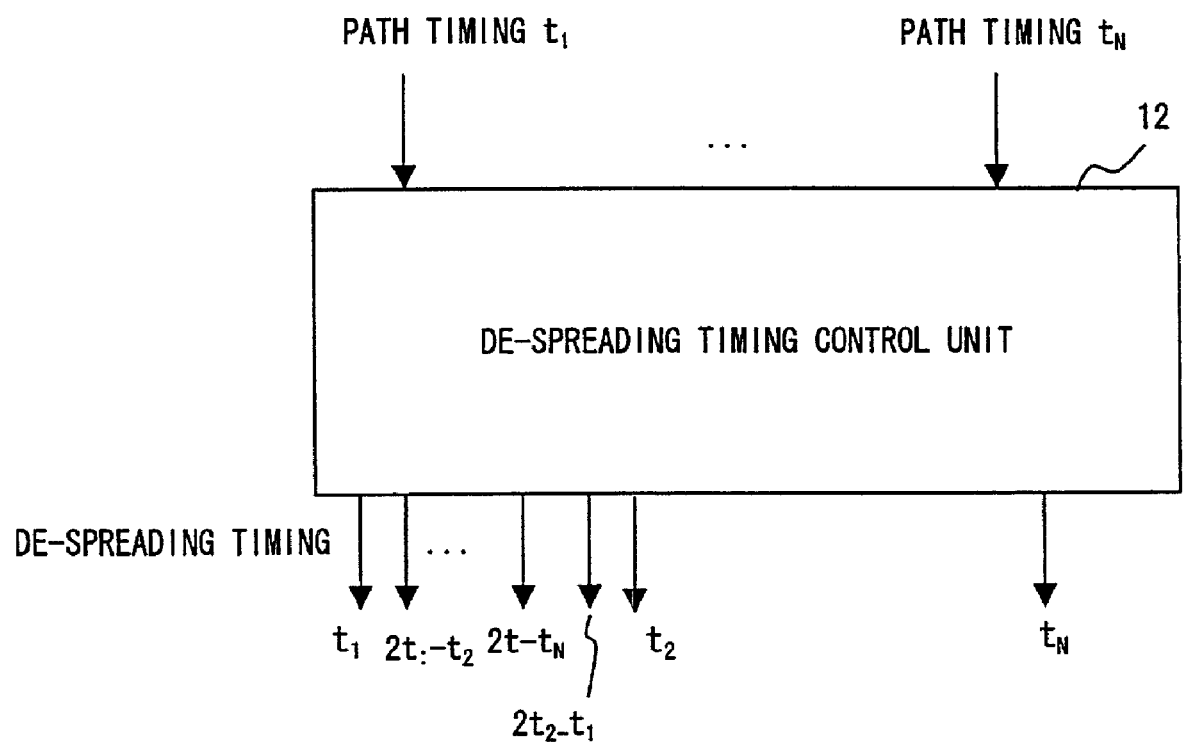
F I G. 9

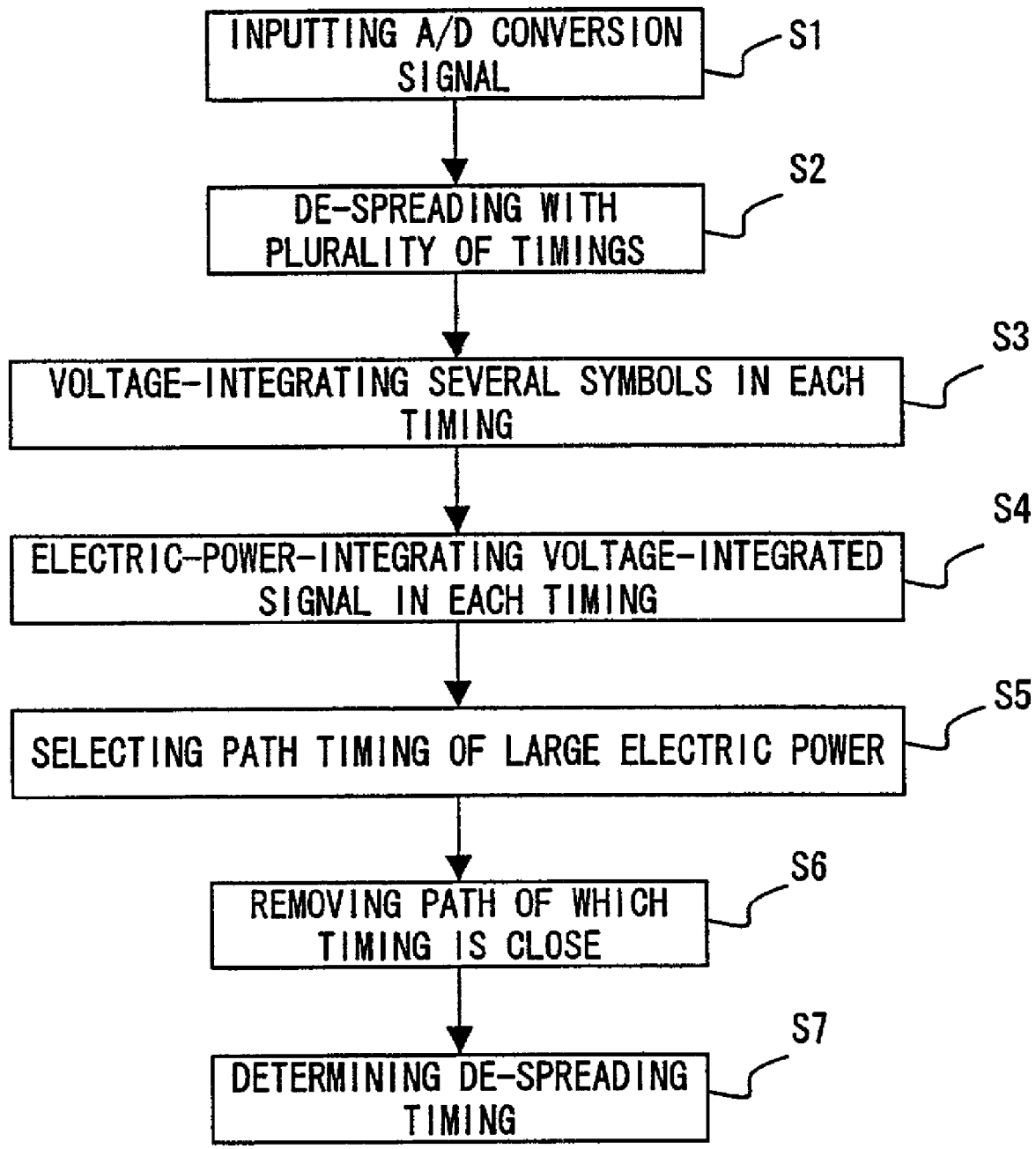
F I G. 1 0

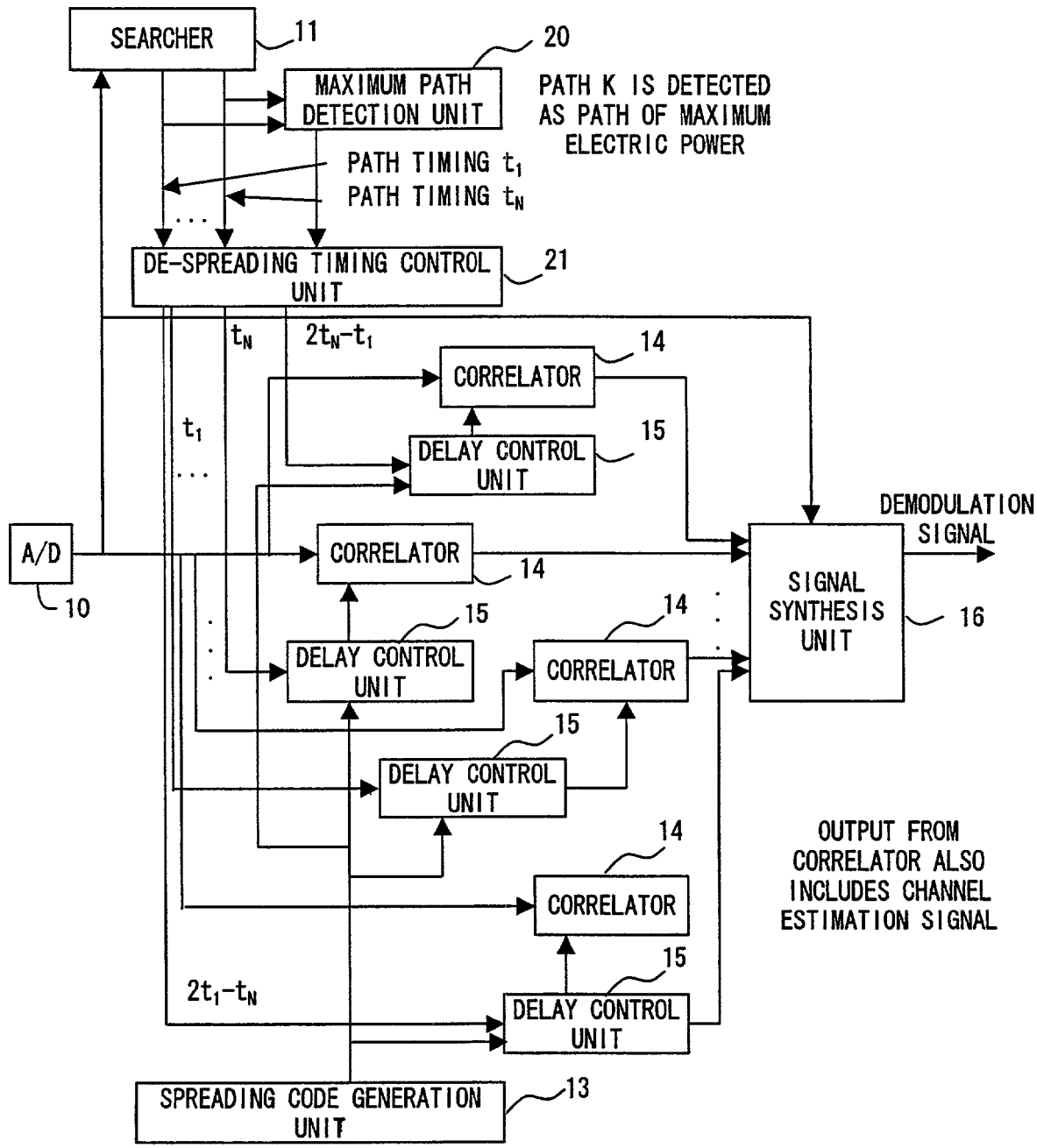
F I G. 1 1

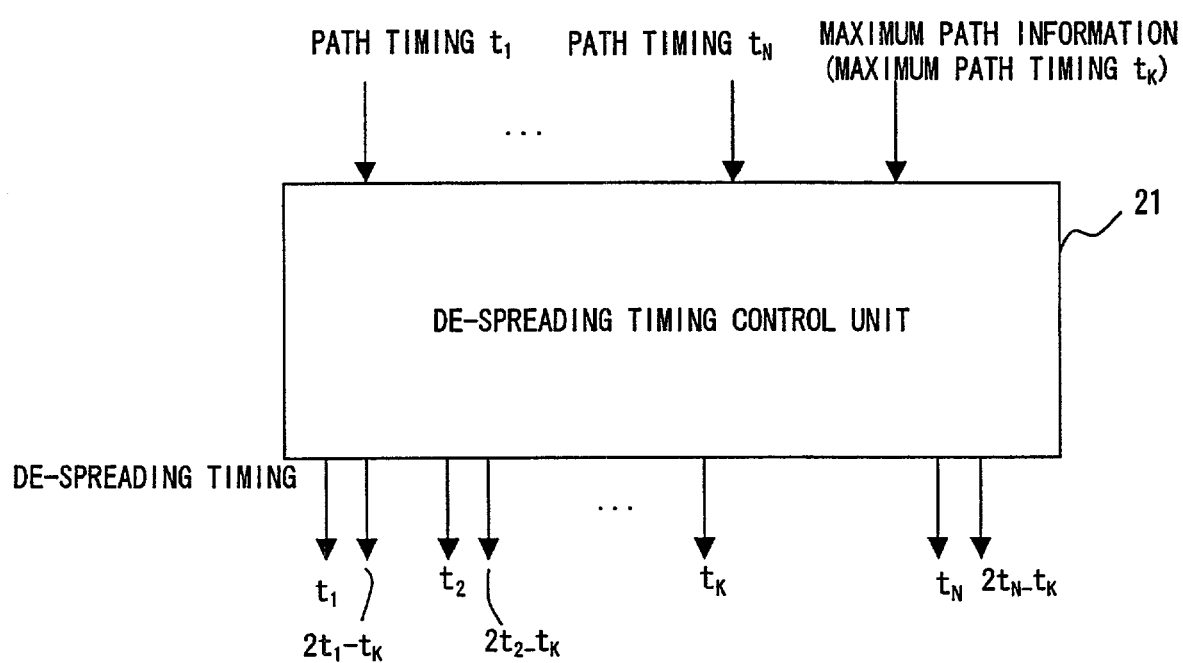
F I G. 1 2

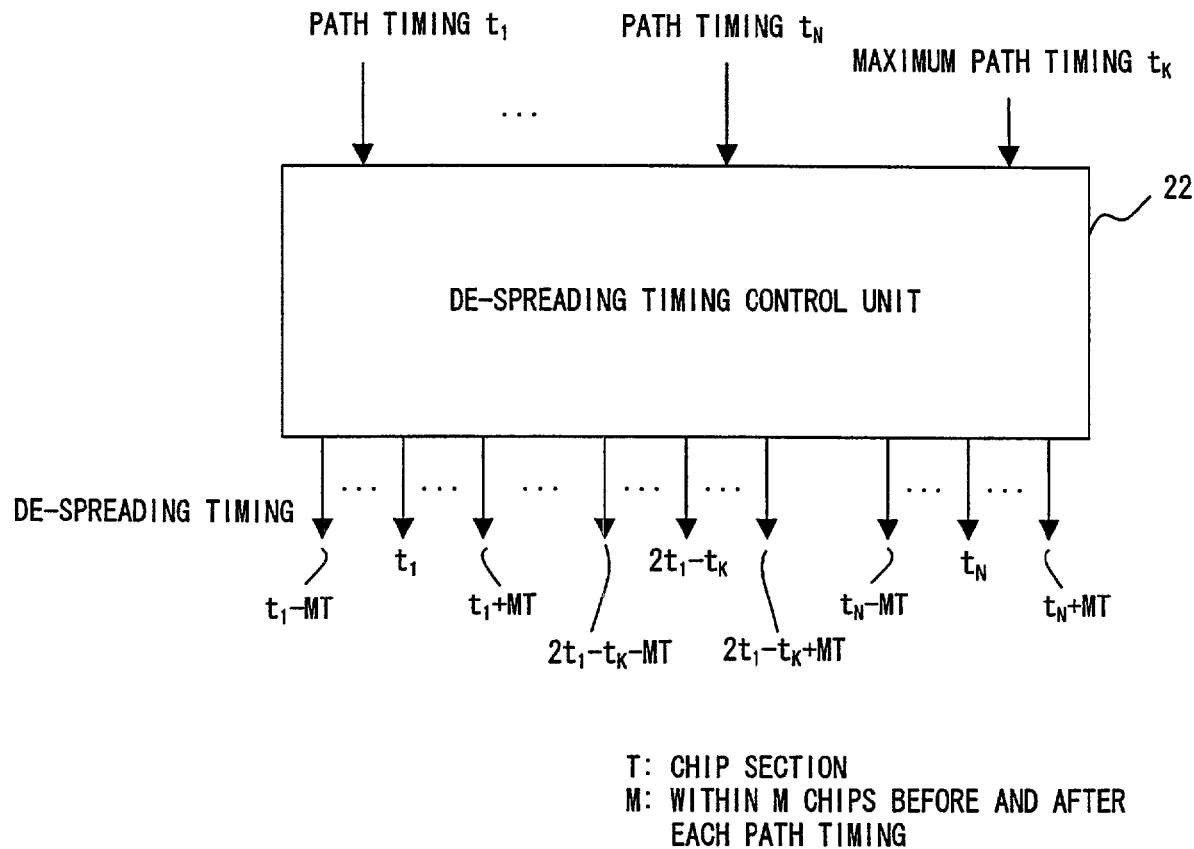
F I G. 1 3

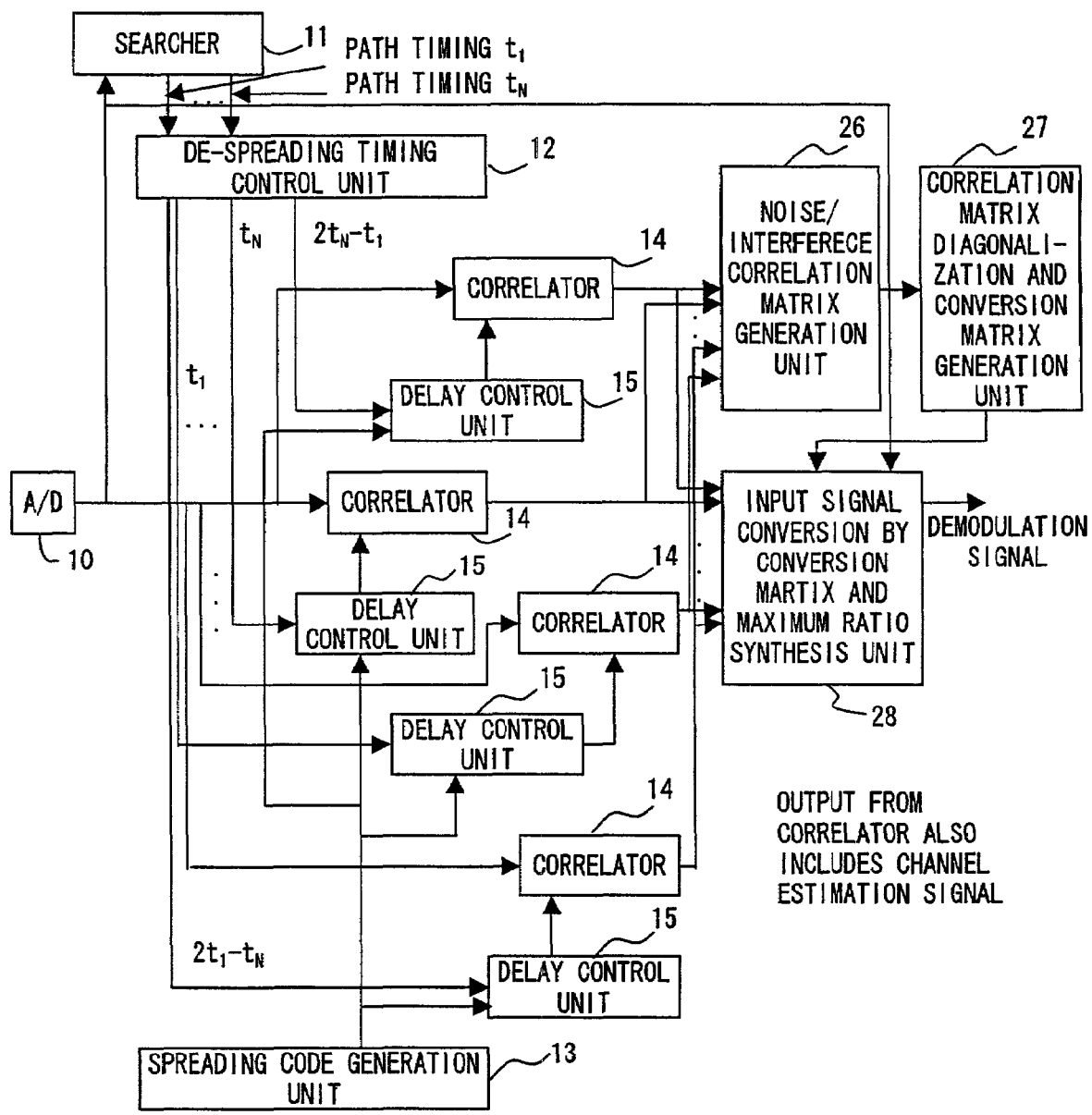
F I G. 1 5

SPREAD SPECTRUM RAKE RECEIVER

BACKGROUND OF THE INVENTION

1. Field of the Invention

The present invention relates to a spread spectrum method, and more particularly to a rake receiver for synthesizing in a time rage, maximum ratios of signals with various time delays, which are received at an antenna, due to the multiple-reflection of a propagation path, as a reception diversity method in a multi-path environment.

2. Description of the Related Art

Spread spectrum or spread spectrum communication is used in a wide area as the most fundamental technology of mobile communication.

In a Direct Sequence (DS) method used as the simplest model of spread spectrum communication, a transmission side modulates as a spread signal, a PN signal with a chip width Tc that is about 1/10 to 1/100 of a cycle T of an information signal to be transmitted, in other words, the PN signal is multiplied by the information signal and the spectrum is expanded, so that the signal is finally transmitted to a reception side.

On the reception side, a signal component is detected by a de-spreading process from among signals that are buried in a noise•Fundamentally, a de-spreading process is to multiply the same PN signal having the same phase as that of the PN signal in a reception signal by the reception signal, thereby demodulating the multiplied PN signal.

In a multi-path environment where many reflection waves exist in addition to direct waves, however, a correct signal component needs to be detected by appropriately synthesizing the reception signals with various time delays.

As one of such conventional technologies, there is a rake method. A rake method is a diversity method for gathering pieces of signal power, that are dispersed like a "rake" by the delay dispersion of a propagation path, thereby synthesizing maximum ratios.

In a conventional rake receiver, a plurality of path timings at which a multi-path arrives are detected using a known signal, and these timings are informed to a demodulator. The demodulator executes a de-spreading process at these timings, and demodulates a desired signal by synthesizing the signals of a multi-path.

FIG. 1 is a block diagram showing a whole constitution of the conventional example of a rake receiver, for example, as a mobile communication terminal. In FIG. 1, the receiver is configured by an antenna 100; a radio reception unit 101; an A/D conversion unit 102; a searcher 103 for detecting timings of a plurality of paths of a multi-path; a de-spreading timing generation unit and a de-spreading unit 104 for executing a de-spreading process for a plurality of paths corresponding to the timings of a plurality of paths that are detected by the searcher 103; a signal synthesis unit 105 for synthesizing signals of a plurality of paths; a signal process unit 106 such as a channel codec, etc. for receiving a signal from the signal synthesis unit 105, and for outputting the reception signal to a display, speaker, etc.; a level measurement unit 107 for measuring levels etc. of the reception signals of a plurality of paths, for forwarding reliability information and signal level information to the signal synthesis unit 105, and also for forwarding transmission electric power control information to be transmitted to a base station, to a transmission unit; and a transmission unit 108 for transmitting the input from a keyboard or a microphone corresponding to the control information from the level measurement unit 107.

FIG. 2 is a block diagram showing the detailed constitution of a signal demodulation unit of FIG. 1, in other words, a de-spreading timing generation unit and a de-spreading unit 104 of FIG. 1. In FIG. 2, the demodulation unit is composed of a spreading code generation unit 110, a plurality of delay control units 111, and a plurality of correlators 112 which correspond to the delay control units.

The spreading code generation unit 110 generates codes to be used for a de-spreading process. The delay control unit 111 controls the delay actions of a plurality of correlators 112 corresponding to the respective timings t1 to tN of a multi-path, which are detected by the searcher 103. Each correlator 112 de-spreads the reception signals output from the A/D conversion unit 102 corresponding to the de-spreading timing that is controlled by the delay control unit 111, and it assigns de-spread signals 1 to N to the signal synthesis unit 105. Then, the signal synthesis unit 105 outputs a demodulation signal that is obtained by synthesizing these de-spread signals. In each de-spread signal, a signal used for channel estimation corresponding to the propagation path coefficient of each multi-path is included.

FIG. 3 is a block diagram showing the constitution example of a MMSE (Minimum Mean Square Error) receiver as another example of a signal demodulation unit. In this MMSE receiver, a MMSE weight coefficient generation unit 123 generates a weight coefficient used for weight-synthesizing a channel estimation value, for example, a reference signal that is obtained from a known signal transmitted from the transmission side while being included in a transmission signal, and the output of a transversal filter 124 made by the delay line with a tap. In other words, in order to minimize the mean square of the synthesized signal and the reference signal, the output of a matched filter 122 for instantaneously detecting a correlation value utilizing a CCD (Charge Coupled Code) element is weighted.

As mentioned above, for example, in FIG. 2, a de-spreading process is executed using the timing of each path of a multi-path. In the case that a de-spreading process is executed at a certain timing, all the signals corresponding to the paths other than this timing become interference. In the case that an orthogonal spreading code is used for a plurality of channels at a descent link from the base station of a CDMA (Code Division Multiple Access) method, there is a problem that the reception characteristics deteriorate due to the multi-path interference.

FIG. 4 is a diagram explaining such multi-path interference. More specifically, FIG. 4 is a diagram explaining the multi-path interference in a propagation environment where signals of two paths arrive at a movable body from the base station.

In the case that a spread signal is multiplexed to be transmitted from a base station to a movable body using an orthogonal spread code, if a de-spreading process is executed at the timing of path A, the de-spreading timing is correct for a signal which arrives via the path A. Further, since the multiplexed spread signals are orthogonal each other, desired signals remain, and no interference ideally occurs.

If a de-spreading process is executed for a signal that arrives via path B, at the timing of path A, however, since a de-spreading timing is not correct, interference occurs to all the signal components including the desired signal component. Even in the case that a de-spreading process is executed for a signal that arrives via path A at the timing of path B, interference similarly occurs to all the signals transmitted via path A. There is a problem that the multi-path interference increases in the case that the electric power of all the signals that are included in a multiplexed signal is bigger than that of a desired signal.

SUMMARY OF THE INVENTION

The present invention aims at offering a rake receiver that can suppress multi-path interference, in the case that a spread spectrum method is used in a multi-path environment, in consideration of the above-mentioned problems.

According to one feature of the present invention, a rake receiver is provided with a path timing detection unit for detecting a path timing of a multi-path from a reception signal; a de-spreading timing setting unit for setting a path timing of the detected path as a de-spreading timing, and for setting as de-spreading timings, timings each of which is symmetric to a path timing in a two-path pair while the other path timing in the two-path pair is as a center with respect to a time axis, and is apart from the other path timing at an interval of a delay time between the path timings of the two paths, in accordance with the respective combinations of two paths of the multi-path, in order to suppress an interference component; a plurality of correlators respectively obtaining de-spread signals of the reception signals corresponding to the respective set timings; and a signal synthesis unit synthesizing outputs of the plurality of correlators.

The above-mentioned rake receiver receives a signal including a known signal from a transmission side, and further it is provided with a weight coefficient generation unit for generating a weight coefficient for synthesizing signals, using algorithm for minimizing the square mean error of the known signal and the synthesized signal by the signal synthesis unit. The signal synthesis unit can weight-synthesize the outputs of a plurality of correlators using the weight coefficient.

According to the above-mentioned rake receiver, a de-spreading timing setting unit can establish as de-spreading timings, timings at chip locations in the vicinity of several chips of all the above-mentioned timings, in addition to a path timing of the detected path and two timings for each two-path pair. Further, in addition to a path timing of the detected path and the respective two timings, the de-spreading timing setting unit can establish as de-spreading timings a plurality of timings that are apart from the path timing set as the center at an interval that is obtained by multiplying an integer (within a plurality of times) by the delay time in the direction of a path timing of the other path, for the respective combinations of the two-path pair.

According to another feature of the present invention, the rake receiver is provided with a conversion matrix generation unit obtaining the correlation of interference components of de-spread signals outputted by a plurality of correlators and generating a conversion matrix to remove the correlation, and a signal synthesis unit for synthesizing the outputs of a plurality of correlators using the generated conversion matrix, in addition to the path timing detection unit, the de-spreading timing setting unit, and a plurality of correlators.

According to still another feature of the present invention, a rake receiver is provided with a path timing detection unit detecting path timings of paths of a multi-path and a path timing of the maximum reception electric power; a de-spreading timing setting unit for setting the detected path timings as de-spreading timings, and for setting as de-spreading timings, timings that are symmetric to the path timing of reception maximum electric power on a time axis by setting the delay time between the two path timings while setting the timing of an optional path as a center, in accordance with the respective combinations of two paths of an optional path of the multi-path and the path of maximum reception electric power, from among the multi-path; a plurality of correlators respectively obtaining de-spread signals of the reception signals corresponding to the respective set timings, and a signal synthesis unit synthesizing outputs of the plurality of correlators.

According to still another feature, a rake receiver of the present invention is provided with the previously mentioned path timing detection unit; the de-spreading timing setting unit; the plurality of correlators; and a weight synthesis unit weight-synthesizing the outputs of the two correlators corresponding to the timing of the optional path and the timing which is located at the symmetric position, for the respective combinations; and a signal synthesis unit synthesizing the results obtained by weight-synthesizing by the weight-synthesizing unit and the outputs of a correlator corresponding to the timing of a path of the maximum reception electric power.

The weight synthesis unit that is installed in the rake receiver can be further provided with a weight coefficient calculation unit obtaining a weight coefficient to be multiplied by the output of the correlator corresponding to the timing at the symmetric position, using channel estimation values of an optional path and a maximum electric power path, A/D conversion results of a signal received from a transmission side, and a constant indicating an electric power ratio of the electric power of a channel estimation signal to that of the signal of a path.

In this case, the weight coefficient calculation unit can use the value that is notified from a transmission side as the above-mentioned constant value. The weight coefficient calculation unit can also use as the constant value, the average electric power of signals of the A/D conversion results, the electric power of a desired signal component obtained by a de-spreading process, and the average electric power of output signals of the correlator corresponding to the timing at the symmetric position.

As mentioned above, the rake receiver of the present invention sets a timing for suppressing an interference component in addition to the path timing of a multi-path, as a de-spreading timing, and it synthesizes de-spread signals corresponding to the respective set timings.

BRIEF DESCRIPTION OF THE DRAWINGS

The futures and advantages of the present invention are more clearly appreciated from the following description taken in conjunction with the accompanying drawings in which like elements are denoted by like reference numerals and in which:

FIG. 9 illustrates an explanation of the actions of a de-spreading timing control unit of the first preferred embodiment;

FIG. 10 is a flowchart of a path timing detection process by a searcher;

FIG. 11 is a block diagram showing the constitution of a demodulator of the second preferred embodiment;

FIG. 12 illustrates the actions of a de-spreading timing control unit of the second preferred embodiment;

FIG. 13 illustrates the actions of a de-spreading timing control unit of the third preferred embodiment;

FIG. 15 is a block diagram showing the constitution of a demodulator of the fifth embodiment;

DESCRIPTION OF THE PREFERRED EMBODIMENTS

Figure 5:
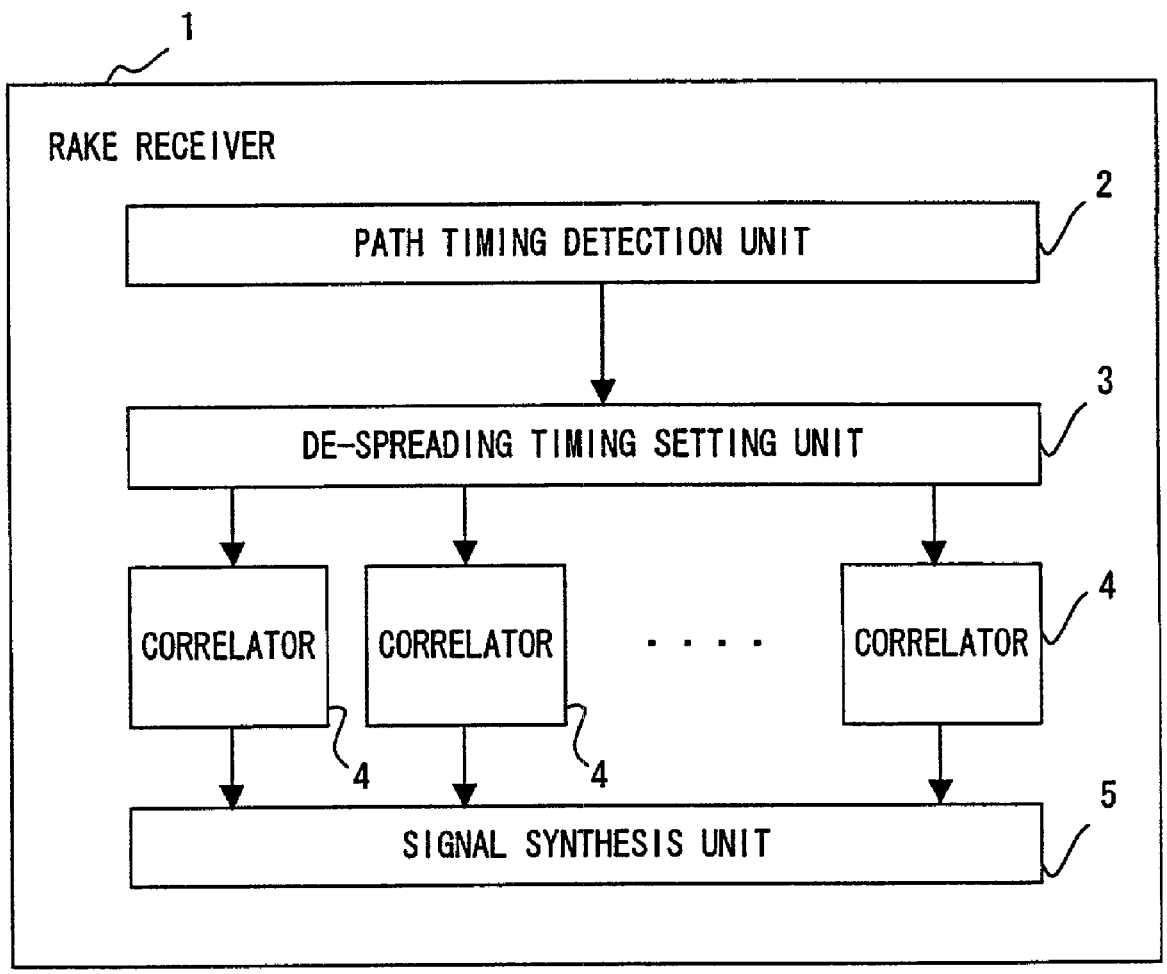
FIG. 5 is a block diagram showing the principle constitution of a rake receiver of the present invention.

FIG. 5 is a block diagram showing the principle constitution of a rake receiver of the present invention. More specifically, this drawing is a block diagram showing the principle constitution of a rake receiver 1 that configures a spread spectrum communication system in a multi-path environment.

In FIG. 5, a path timing detection unit 2 is, for example, a path searcher, and it detects the path timings of a multi-path, for example, timings of N paths.

The de-spreading timing setting unit 3 sets a timing of the detected path as a de-spreading timing. In order to suppress the interference between signals of paths, the de-spreading timing setting unit 3 sets as de-spreading timings, two timings that are symmetric to the timing of the other path on a time axis by setting the delay time between the two path timings while setting the timing of one path as a center, in accordance with the respective combinations of two paths from among N paths.

A plurality of correlators 4 obtain de-spread signals of signals that are transmitted from a transmission side corresponding to respective set timings, for example, signals of A/D results. A signal synthesis unit 5 synthesizes the outputs of a plurality of correlators 4, and outputs a demodulation signal.

In the present invention, in order to suppress the interference caused by the signals of the other paths when a de-spreading process is executed at the timing corresponding to a certain path on a reception side in the spread spectrum method in a multi-path environment, a new timing is set by using the time difference between the timings of two paths, so that the interference can be suppressed by adding a de-spreading process at the new timing. The following is an explanation about the principle of the actions.

When the signals of a multi-path are de-spread at a timing, the signal of a path that generates interference is determined by a mutual correlation value of de-spreading processes, an attenuation coefficient of a propagation path and the like. This correlation value of de-spreading processes is determined by the delay between the timing of a signal that arrives through a path and a de-spreading timing.

Figure 6:
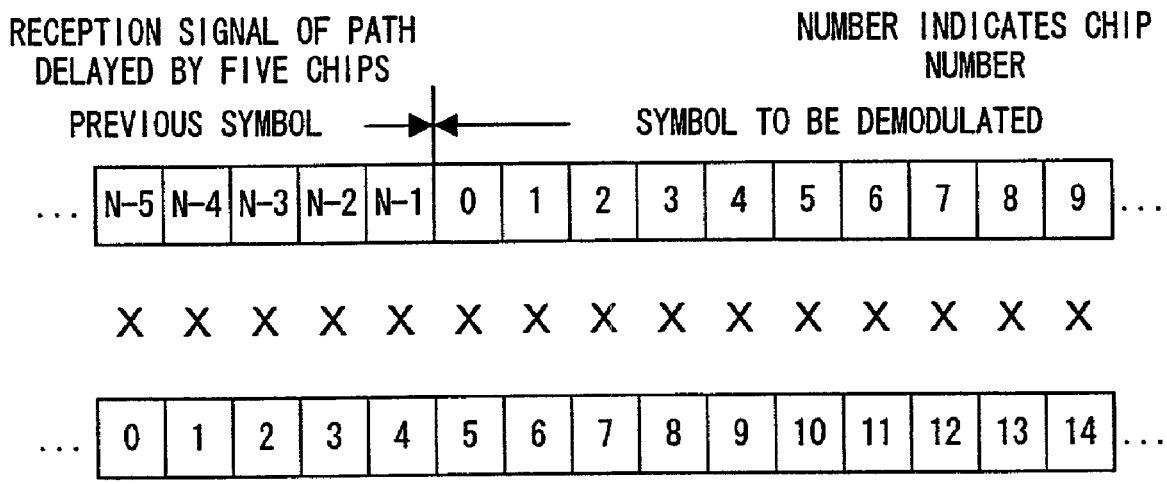
FIG. 6 explains a de-spreading process of a signal that arrives behind a de-spreading timing.

FIG. 6 illustrates an explanation of a de-spreading process for a signal that arrives through a certain path behind five chips to the de-spreading timing. The de-spreading process at this time starts at the product of a signal of the fifth chip from the end of one preceding symbol to be demodulated and the first chip of a de-spreading code. Therefore, a de-spreading process cannot be correctly executed, since the reception signal is delayed by five chips.

Considering two paths A and B, a de-spread correlation value of path B is set X in the case of a de-spreading process executed at the path timing of path A, and a de-spread correlation value of path A is set Y when a de-spreading process is executed at a timing that is moved in a direction opposite to path B, which is viewed from path A, by the delay time between the timings of path A and path B. At this time, X and Y become equal. In the preferred embodiments, the interference electric power is minimized using this relation, so that the interference can be finally suppressed.

Figure 7:
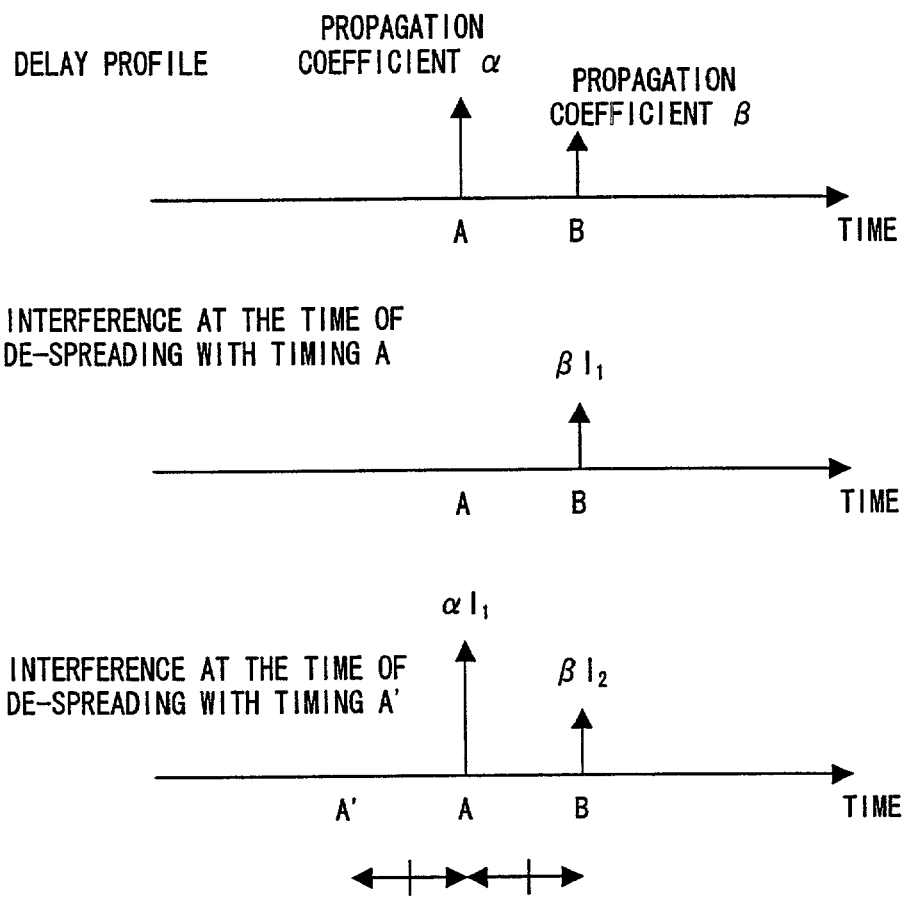
FIG. 7 is a diagrammatic illustration of the occurrence of the interference component generated by declination of a de-spreading timing.

As shown in FIG. 7, in order to suppress the interference component of signal $v_A$ in the case that a de-spreading process is executed at the path timing of path A, this interference component is suppressed by multiplying by a certain weight coefficient w, a signal $v_A'$ that is de-spread at a timing of A' symmetrical to path B while setting the path timing of path A as a center, to thereby be synthesized with the signal $v_A$. The following is an explanation of how to obtain this weight coefficient w.

The following equation indicates a de-spread signal that is de-spread at the timing of path A.

$$v_A = \alpha S + \beta I_1 + n_A \quad (1)$$

Next, the following equation indicates a signal that is de-spread at a timing symmetric to the timing of path B, that is, the timing of a hypothesis path A'.

$$v_A' = \alpha I_1 + \beta I_2 + n_A' \quad (2)$$

Here, $\alpha$ and $\beta$ indicate propagation path coefficients, S indicates a de-spread desired signal component (here, a desired signal means the original signal to be de-spread corresponding to a de-spreading code), and $I_1$ indicates an interference component generated when a signal is de-spread at a timing that is delayed by a delay time between a path timing of path A and that of path B, in accordance with a timing of the signal. $I_2$ indicates an interference component generated when a signal is de-spread at a timing that is delayed by twice the delay time between a path timing of path A and that of path B, in accordance with the timing of the signal. $n_A$, and $n_A'$ indicate noise components when a signal is de-spread at path timings A and A', respectively.

Furthermore, each of $I_1$, $I_2$, etc. is physically an amount proportional to, for example, a electric current while each of $v_A$ or the like is an amount equivalent to voltage. If it is assumed that the impedance is constant, the temporal average electric power of $I_1$ is indicated by $I_1^2$.

When a signal obtained by multiplying $v_A'$ by a weight coefficient w to be synthesized with $v_A$ is set $u_A$, $u_A$ is obtained by the following equation.

$$u_A = v_A + w v_A' = \alpha S + m_A \quad (3)$$

The interference component $m_A$ of this equation is obtained by the following equation.

$$m_A = (w\alpha + \beta)I_1 + w\beta I_2 + n_A + w n_A' \quad (4)$$

It is necessary to decide a weight coefficient w so as to minimize the average electric power of this interference component. When the average electric power of each of $I_1$ and $I_2$ is set $I^2$, the average electric power of each of $n_A$ and $n_B$ is set $N^2$, and a fact that no correlation exists between the respective components is used, the average electric power $P_A'$ of an interference component $m_A$ is obtained by the following equation.

$$P_A' = E(|m_A|^2) \quad (5)$$
$$= (|W\alpha + \beta|^2 + |w\beta|^2)I^2 + (1 + |w|^2)N^2$$

Here, E (x) indicates the average value of x. A weight coefficient w for minimizing interference electric power $P_A'$ is obtained as a value that satisfies the following equation.

$$dP_A'/dw = 0 \quad (6)$$

By solving this equation, w is obtained by the following equation. Furthermore, * indicates a complex conjugate number.

$$w = -\frac{\alpha^* \beta I^2}{(|\alpha|^2 + |\beta|^2)I^2 + N^2} \quad (7)$$

In the case no noise component is present in the equation (7), $N^2 = 0$, and w is obtained by the following equation.

$$w = -\frac{\alpha^* \beta}{|\alpha|^2 + |\beta|^2} \quad (8)$$

In this case, the average interference electric power $P_A$ of $v_A$ before synthesis is obtained by the following equation.

$$P_A = |\beta|^2 I^2 \quad (9)$$

On the contrary to this, the average interference electric power after synthesis is obtained by the following equation.

$$P_A' = \frac{|\beta|^2}{|\alpha|^2 + |\beta|^2} |\beta|^2 I^2 \quad (10)$$

It is clear that the average interference electric power becomes small, by comparing equations (9) and (10).

Figure 8:
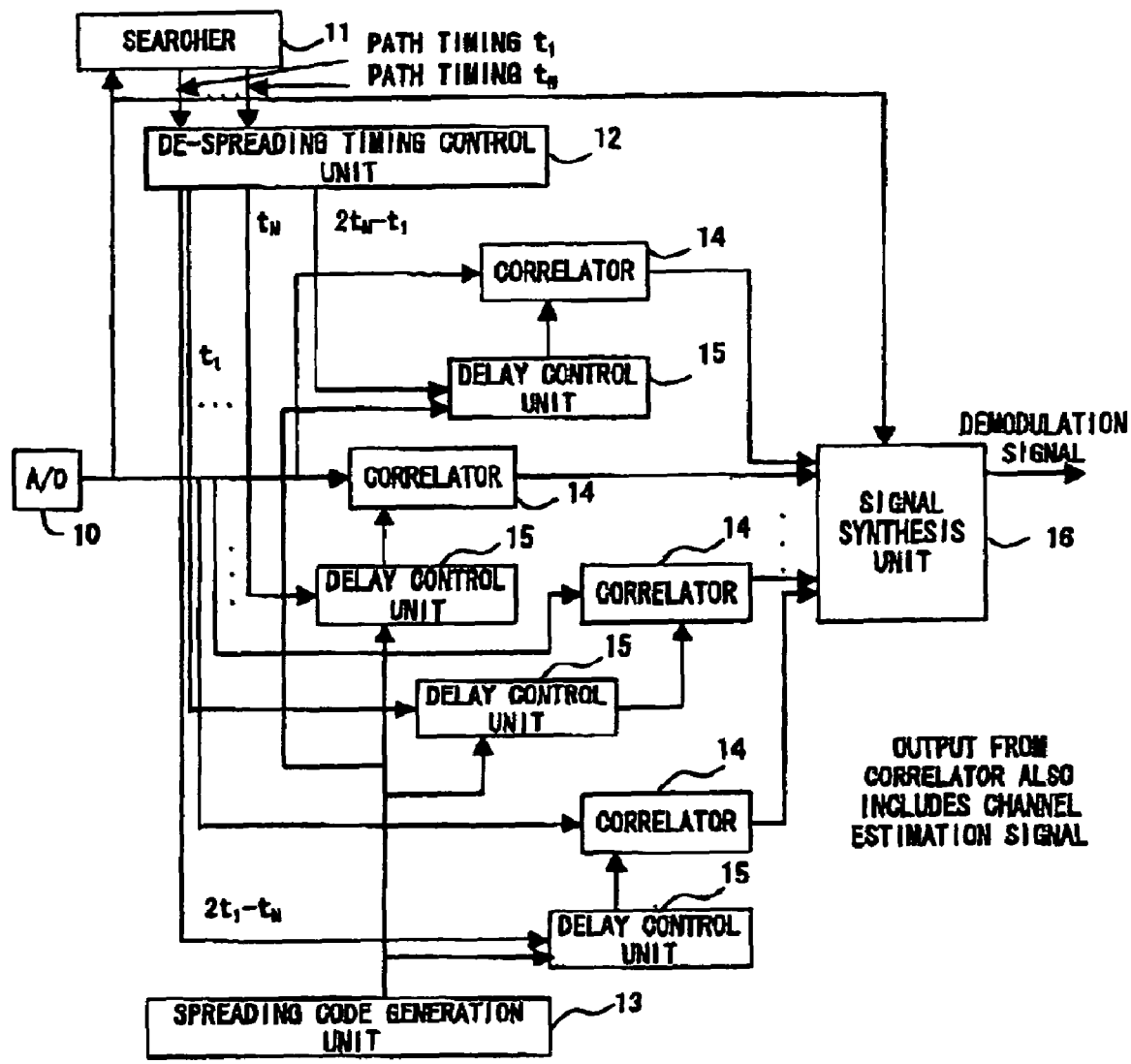
FIG. 8 is a block diagram showing the constitution of a demodulator according to the first embodiment of the present invention.

FIG. 8 is a block diagram showing the constitution of a demodulator of the first embodiment of the present invention. In this figure, the demodulator is configured by an A/D conversion device 10 for converting a reception analogue signal into a digital signal; a searcher 11 for detecting the timing of each path of a multi-path; a de-spreading timing control unit 12 for controlling the timing of a de-spreading process using the output of the searcher 11; a spreading code generation unit 13 for generating a spreading code used for a de-spreading process; a plurality of correlators 14; a delay control unit 15 for controlling the timing of a de-spreading process on the basis of the control of the de-spreading timing control unit 12 corresponding to each correlator; and a signal synthesis unit 16 for synthesizing the outputs of the respective correlators 14.

Here, channel estimation is equivalent to the estimation of point a from point a' using an absolute value of, for example, the following two vectors $\vec{o}_a$ and $\vec{o}'_a$, and a propagation coefficient corresponding to an angle formed by the two vectors when four symbols that are transmitted from a transmission side using a QPSK (Quadrature Phase Shift Keying) conversion method, are indicated by four points of a, b, c, and d on an I-Q plane, and these points are received as points a', b', c', and d' on the reception side. In other words, the estimation of a coordinate system is executed. In this embodiment, this channel estimation is executed by the signal synthesis unit 16.

In the first embodiment, if the timing of path A is earlier than the timing of path B as explained in FIG. 7 corresponding to optional two paths A and B of a multi-path, a de-spreading process is executed at the timing of A' and a de-spreading process is also executed at a timing which is behind the timing of B by the delay time between the timing of B and the timing of A, as explained in FIG. 7.

In the first embodiment, the weight synthesis of a de-spread signal used for the interference suppression that is explained in the equations (1) to (10) is executed by the signal synthesis unit 16. The details of the synthesis will be described later as the seventh embodiment.

FIG. 9 illustrates an explanation of the de-spreading timing control by a de-spreading timing control unit of the first embodiment. If N timings $t_1$ to $t_N$ are detected as path timings by the searcher 11, N−1 timings of $2t_1-t_2$, $2t_1-t_3$, ..., $2t_1-t_N$ are obtained in addition to the de-spreading timing $t_1$ as de-spreading timings that are earlier than, for example, a path timing $t_1$.

FIG. 10 is a flowchart of a path search process executed by the searcher 11 as shown in FIG. 8. In FIG. 10, the searcher 11 firstly receives a conversion signal of the known signal to be used for, for example, channel estimation, from the A/D conversion unit 10 at sep S1. The searcher 11 executes a de-spreading process at a plurality of timings at step S2, and obtains the voltage-integrations of several symbols at each timing in order to reduce the influence of fading or interference noise at step S3. Furthermore, the searcher 11 electric-power-integrates signals that are voltage-integrated, at each timing at step S4.

Then, the searcher 11 selects a path of the timing with big electric power at step S5, since it is effective to synthesize signals of a path of a timing with big electric power when signals of a multi-path are synthesized. Since the correlation of signals and interference noise is high among the closed paths, while the synthesis gain is small, a path of the timing that is closed to a timing of the selected path is removed at step S6. The searcher 11 decides a de-spreading timing at step S7, corresponding to the remaining path timings, for example, N path timings of $t_1$ to $t_N$ shown in FIGS. 8 and 9.

FIG. 11 is a block diagram showing the constitution of a demodulator of the second embodiment. In this second embodiment, the searcher detects the timing of a path with maximum signal electric power, instead of setting two new de-spreading timings for suppressing interference components between optional two path timings in the first embodiment. Then, the searcher sets a new de-spreading timing for suppressing the interference components between a timing of the detected path and a timing of the other optional path.

In FIG. 11, a timing of a path with maximum signal electric power is detected by a maximum path detection unit 20 from, for example, N path timings detected by the searcher 11. Using this detected timing, a de-spreading timing is set by a de-spreading timing control unit 21, and a demodulation action is executed.

FIG. 12 illustrates the operations of the de-spreading timing control unit 21 in the second embodiment. In this figure, $t_k$ is detected by the maximum path detection unit 20 as the timing of a path with maximum signal electric power from the path timings $t_1$ to $t_N$ that are detected by the searcher 11. The detected timing is assigned to the de-spreading timing control unit 21. Then, $2t_1-t_k$, $2t_2-t_k$, ..., $2t_N-t_k$ are set by the de-spreading timing control unit 21 as de-spreading timings before the de-spreading timings that agree with the respective path timings.

FIG. 13 illustrates the operations of a de-spreading timing control unit of the third embodiment of the present invention. In this third embodiment, de-spreading timings in several chips before and after the respective de-spreading timings are added, in addition to the de-spreading timings that are explained, for example, in FIG. 9 or FIG. 12.

In other words, when a chip section of, for example, a de-spreading timing $t_1$ is set T, de-spreading timings within M chips before and after this timing, that is, $t_1-MT$, $t_1-(M-1)T$, ..., $t_1-T$ are added before the de-spreading timing $t_1$, while de-spreading timings of $t_1+T$, ..., $t_1+(M-1)T$, and $t_1+MT$ are added after the de-spreading timing $t_1$.

Figure 14:
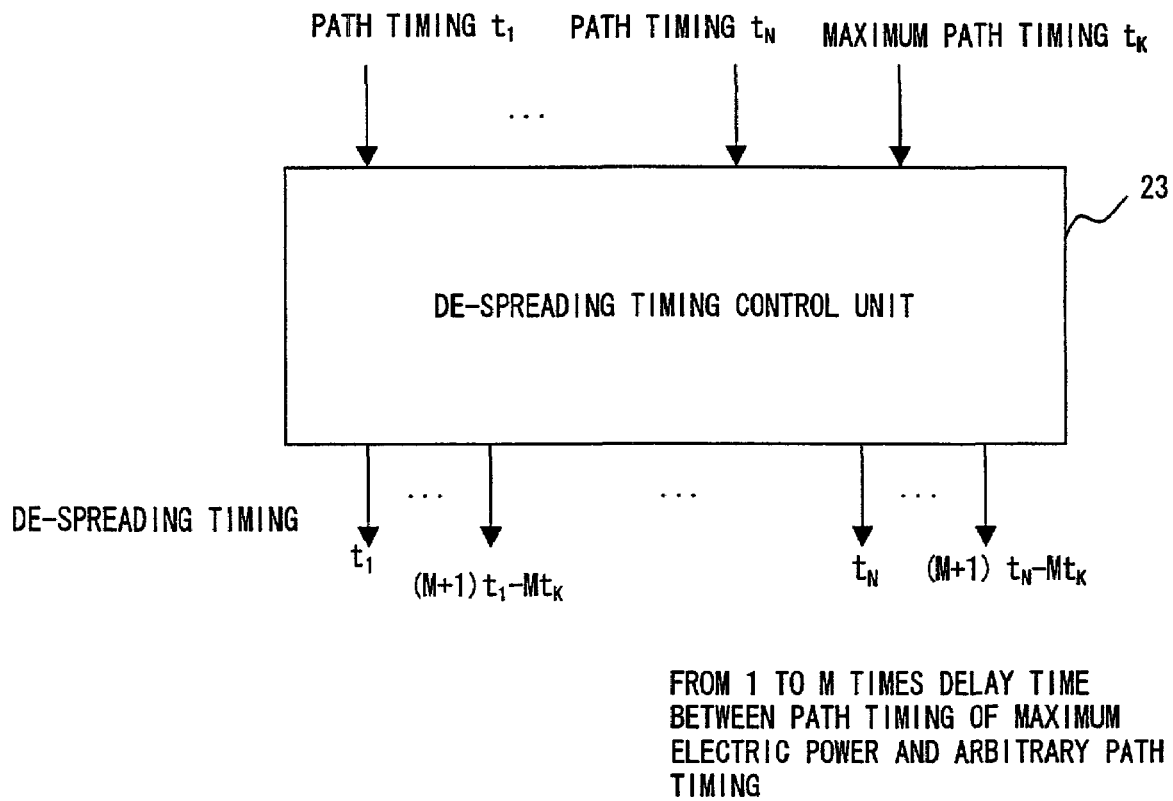
FIG. 14 illustrates the actions of a de-spreading timing control unit of the forth preferred embodiment.

FIG. 14 illustrates the operations of a de-spreading timing control unit of the fourth embodiment. In this fourth embodiment, several de-spreading timings are added further before or after the de-spreading timing at intervals equal to the delay time between a path with maximum signal electric power and the other optional path, in addition to the de-spreading timings explained, for example, in FIG. 9 or FIG. 13. For example, de-spreading timings, $(M+1)t_1Mt_k$, $Mt_1-(M-1)t_k$, ..., $3t_1-2t_k$ are added before the de-spreading timing $t_1$ in addition to the timing $2t_1-t_k$ of FIG. 12.

FIG. 15 is a block diagram showing the constitution of a demodulator of the fifth embodiment of the present invention. When the demodulator of the fifth embodiment is compared with, for example, the demodulator of the first embodiment shown in FIG. 9, there arises the following differences. Firstly, a noise•interference correlation matrix generation unit 26 for inputting the outputs of the respective correlators 14 is added. Secondly, a correlation matrix diagonalization.conversion matrix generation unit 27 for inputting these outputs is also added. Thirdly, an input signal conversion and maximum ratio synthesis unit 28 for synthesizing outputs of the plurality of correlators 14 using a matrix generated by the noise•interference correlation matrix generation unit 27 instead of the signal synthesis unit 16, is added Generally, a receiver is configured to maximize a Signal-to-Interference-Ratio (SIR) on a reception side. In the case that a plurality of reception signals of a certain symbol are synthesized, it is known that SIR becomes maximum by synthesizing signals using the ratio of the amplitude level of a desired signal of each reception signal to the electric power of noise•interference as a weight coefficient, after the correlation of a noise•interference is removed. In the receiver of the fifth embodiment, SIR is maximized by obtaining the correlation matrix of noise•interference, diagonalizing the matrix, that is, generating a conversion matrix for removing the correlation of noise/interference components, and converting reception signals using the conversion matrix, thereby synthesizing the signals.

In the receiver of the fourth embodiment, since the noise•interference components of de-spread signals have correlation mutually, the value of SIR cannot be maximized even if the signals are synthesized on the basis of the amplitude level and interference level. In the receiver of the fifth embodiment, since a plurality of reception signals are synthesized as signals that have no correlation each other, the signal quality after the synthesis can be improved.

The technology of generating such a correlation matrix of noise/interference, generating a matrix for diagonalizing or converting the correlation matrix, and converting an input signal using the converted matrix is well known. An explanation of the outline of this technology is described hereinafter, since it is applied to the present embodiments.

Figure 16:
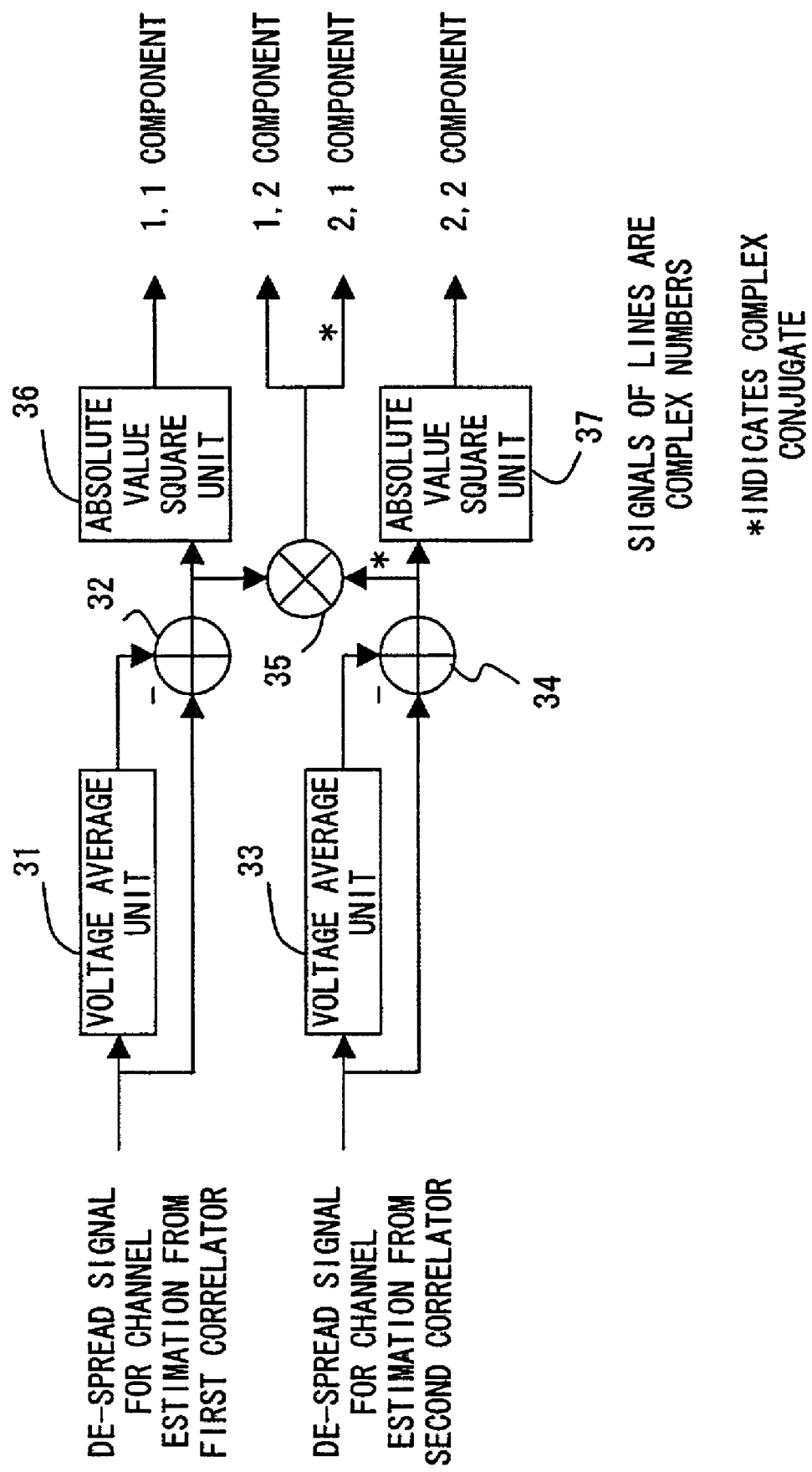
FIG. 16 illustrates the correlation matrix generation actions of noise•interference.

FIG. 16 illustrates the operations of the noise•interference correlation matrix generation unit 26. This drawing illustrates the correlation matrix (two columns, two rows) generation process corresponding to the outputs of two correlators from among a plurality of correlators 14. In the present embodiment, two signals such as a signal for channel estimation (de-spreading) and a desired de-spread signal (signal to be used for signal synthesis) corresponding to each de-spreading timing are output as signals that differ in code.

In the general case that an element of i columns and j rows is generated for a correlation matrix, the element is generated by using a channel estimation de-spread signal $v_i$ used as the output of the i-th correlator and a channel estimation de-spread signal $v_j$ used as the output of the j-th correlator. $v_i$ and $v_j$ are shown by the following equation.

$$\left. \begin{array}{l} v_i = a_k s_i + n_i \\ v_j = a_k s_j + n_j \end{array} \right\} \quad (11)$$

Here $a_k$ is a known symbol pattern called a pilot pattern and the like. $S_i$ indicates the size of a desired signal component of the output of the i-th correlator, while $n_i$ indicates a noise•interference component.

After the known symbol pattern $a_k$ output from the channel estimation de-spread signals of two correlators is cancelled in FIG. 16 (not shown in the drawing), a plurality of symbols of the outputs of the respective correlators are averaged by a voltage average units 31 and 33, and the noise•interference components are attenuated, thereby extracting a desired signal component.

Then, only noise•interference components are extracted from a de-spread signal by attenuators 32 and 34, thereby obtaining the complex conjugate number of an output of the attenuator 34 on the side of the j-th correlator, that is, the second correlator. A multiplier 35 multiplies the output of the attenuator 32 by the complex conjugate number of the attenuator 34. Then, the output of the multiplier 35 becomes an element of column 1, row 2, while the complex conjugate number of the output of the multiplier 35 becomes an element of column 2, row 1.

Further, the absolute value of an output of the attenuator 32 is squared by an absolute value square unit 36, and an element of column 1, row 1 is obtained. Then, the absolute value of an output of the subtracter 34 is squared by an absolute value square unit 37, and an element of column 2, row 2 is obtained.

The following is an explanation of the generation method of diagonalization•conversion matrix of the correlation matrix of noises•interference. The correlation matrix (N-th square matrix) of noises•interference that is obtained according to the explanation of FIG. 16 is set the following variable $X_0$ of an equation (12).

$$X_0 = (x_{0,i,j}) \quad (12)$$

A component composed of the noise•interference component $n_i$ of the output of the first correlator that is included in the noise•interference component $n_j$ of an output of the i-th correlator becomes $x_{o,j,1} \times n_1/x_{o,1,1}$. Here, j indicates a value from i+1 to N. Accordingly, by reducing this value from $n_i$, the correlation component with the noise•interference component of the output of the first correlator can be removed from the noise•interference component of the output of the i-th correlator.

By executing such conversion to the outputs of all the correlators other than the output of the first correlator, the correlation of the noise•interference component of the output of the first correlator with the output of the second and subsequent correlators can be removed. This conversion is executed using the following matrix $S_0$ of an equation (13).

$$S_0 = \begin{pmatrix} 1 & 0 & 0 & \cdots & 0 & 0 & 0 \\ -\frac{x_{0,2,1}}{x_{0,1,1}} & 1 & 0 & \cdots & 0 & 0 & 0 \\ & & \vdots & & & & \\ -\frac{x_{0,N,1}}{x_{0,1,1}} & 0 & 0 & \cdots & 0 & 0 & 1 \end{pmatrix} \quad (13)$$

The following converted correlation matrix of noise•interference is such a matrix composed of elements in first column and first row are all 0s except for an element $X_1$ of column 1, row 1. The other elements are obtained by the following equation.

$$x_{1,i,j} = x_{0,i,j} - \frac{x_{0,i,1} x_{0,j,1}^*}{x_{0,1,1}} \quad (14)$$

Next, this matrix is set as a new correlation matrix, and another conversion matrix is obtained to remove the correlation of the noise•interference component of the output of the second correlator with the noise•interference component of the outputs of the third and subsequent correlators. This conversion matrix is obtained by the following equation (15).

$$S_1 = \begin{pmatrix} 1 & 0 & 0 & \cdots & 0 & 0 & 0 \\ 0 & 1 & 0 & \cdots & 0 & 0 & 0 \\ 0 & -\frac{x_{1,3,2}}{x_{1,2,2}} & 1 & \cdots & 0 & 0 & 0 \\ & & & \vdots & & & \\ 0 & -\frac{x_{1,N,2}}{x_{1,2,2}} & 0 & 0 & 0 & 0 & 1 \end{pmatrix} \quad (15)$$

Such an operation is repeated, thereby removing the correlations among the noise•interference components of the outputs of all the correlators. A final conversion matrix S is generated by multiplying the respective conversion matrixes obtained by executing the above-mentioned operations as shown in the following equation (16).

$$S = S_{N-2} \ldots S_1 S_0 \quad (16)$$

Figure 17:
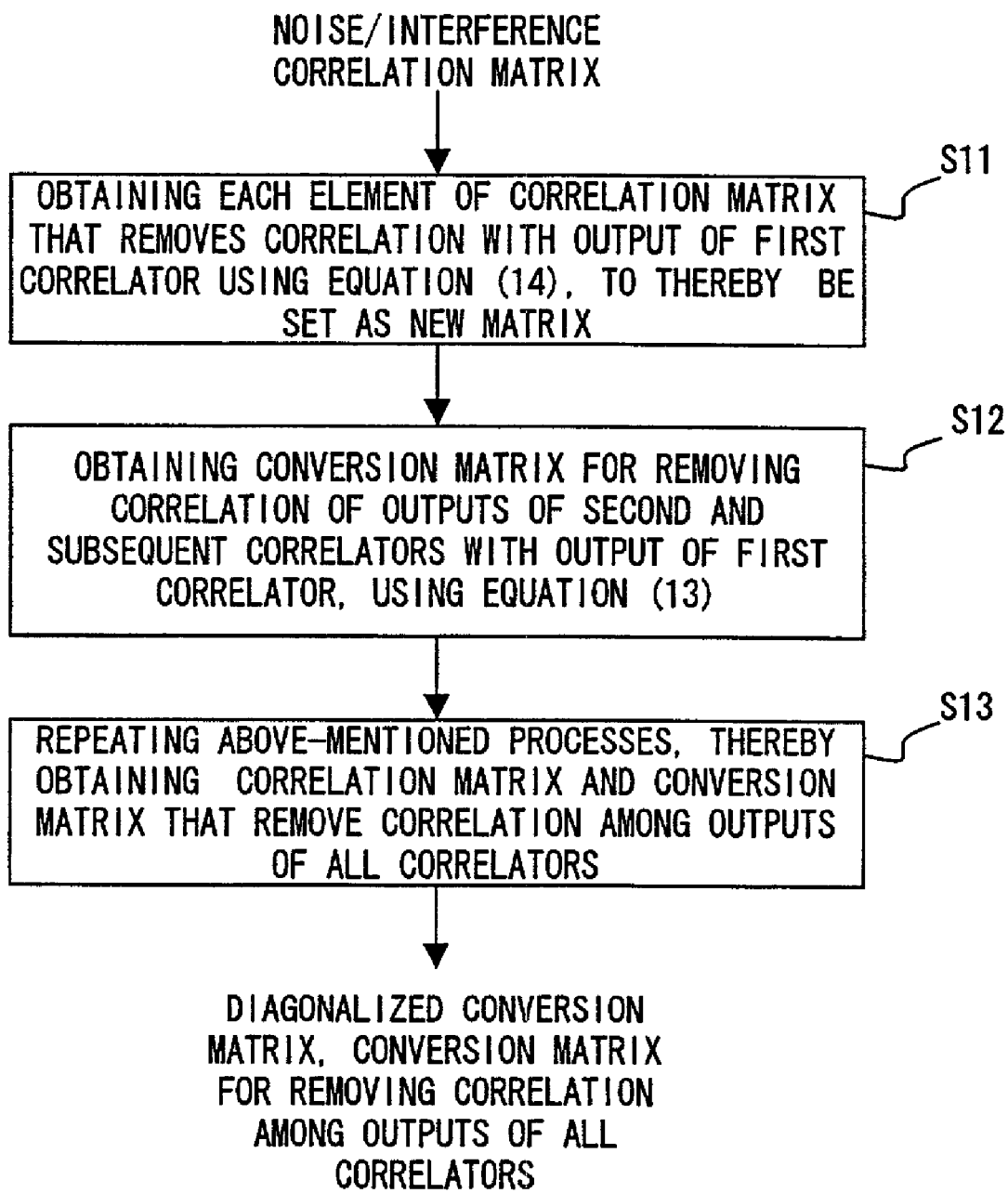
FIG. 17 is a flowchart of correlation matrix diagonalization conversion matrix generation processes.

FIG. 17 is a flowchart of a generation process of a diagonalization.conversion matrix of the correlation matrix of noises.interference. When the process is started in this drawing, the correlation matrix diagonalization.conversion matrix generation unit 27 obtains each element of the correlation matrix $X_1$ of noise•interference using the equation (14) at step S11, for the input of the correlation matrix of noise•interference. At step S12, a conversion matrix is obtained using the equation (13) for the removal of the correlation of the noise•interference component of the output of the first correlator with the noise•interference component of the outputs of the correlators of the second and subsequent correlators. At step S13, the above-mentioned operations are repeated, thereby obtaining a conversion matrix for the removal of correlation of noises.interference components of outputs of all the correlators.

Figure 18:
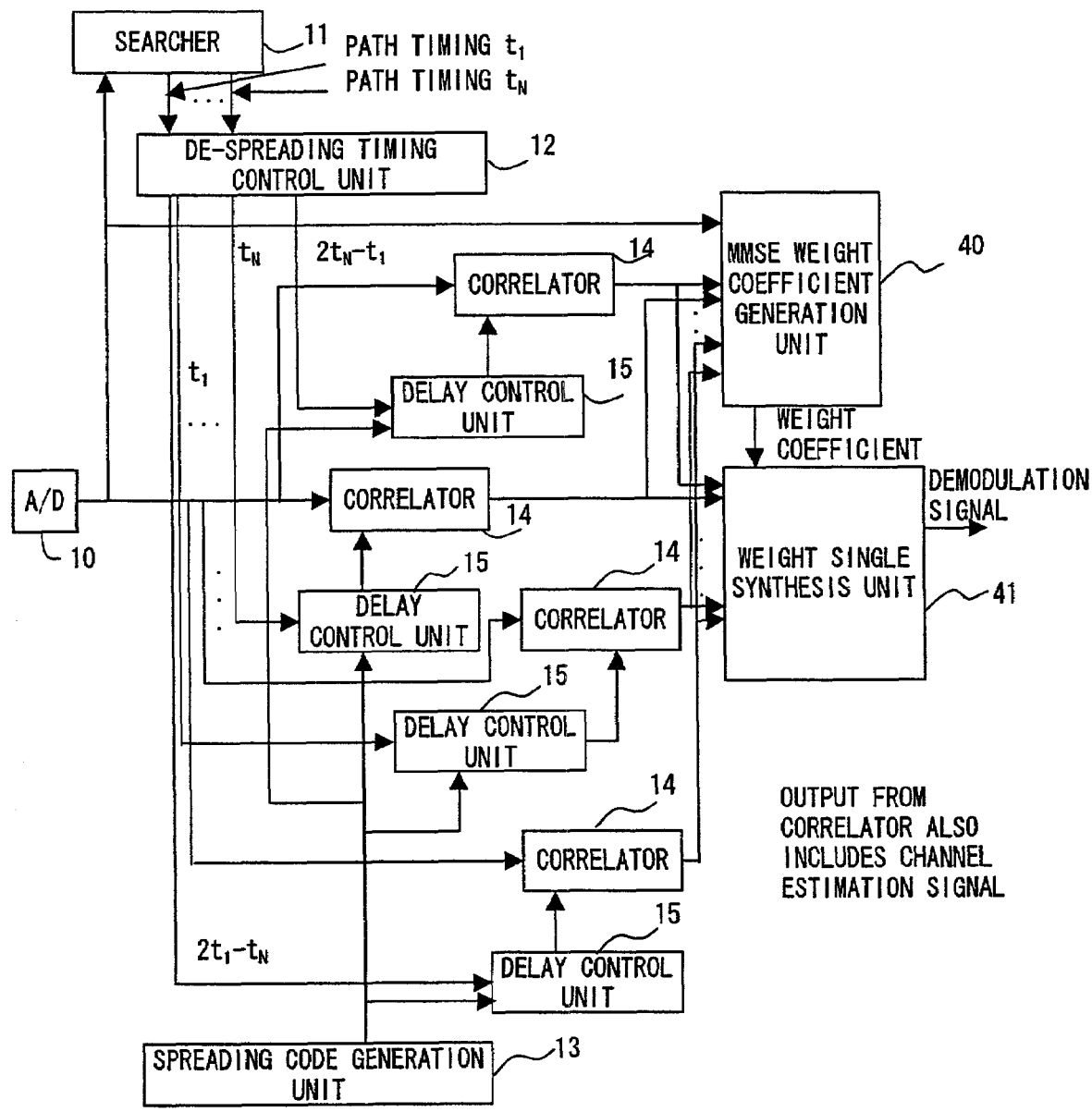
FIG. 18 is a block diagram showing the constitution of a demodulator of the sixth preferred embodiment.

FIG. 18 is a block diagram showing the configuration of the demodulator in the sixth embodiment. When this drawing is compared with FIG. 8 showing the first embodiment, there arises the different points. An MMSE weight coefficient generation unit 40 that configures the MMSE receiver explained in FIG. 3 is added, and a demodulation signal is output by a signal synthesis unit 41 using the weight coefficient.

Figure 1:
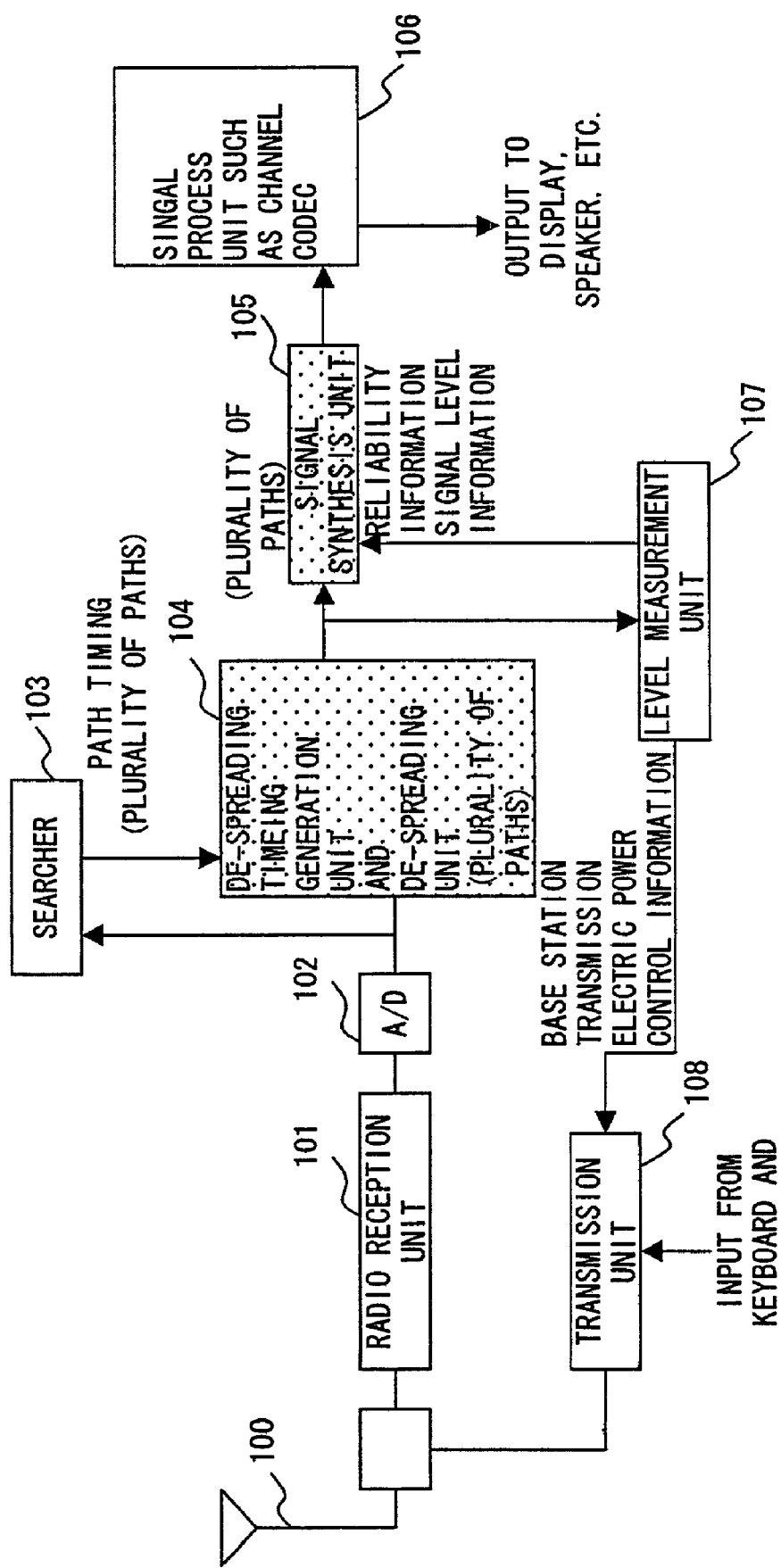
FIG. 1 is a block diagram showing the whole constitution of a rake receiver.
Figure 2:
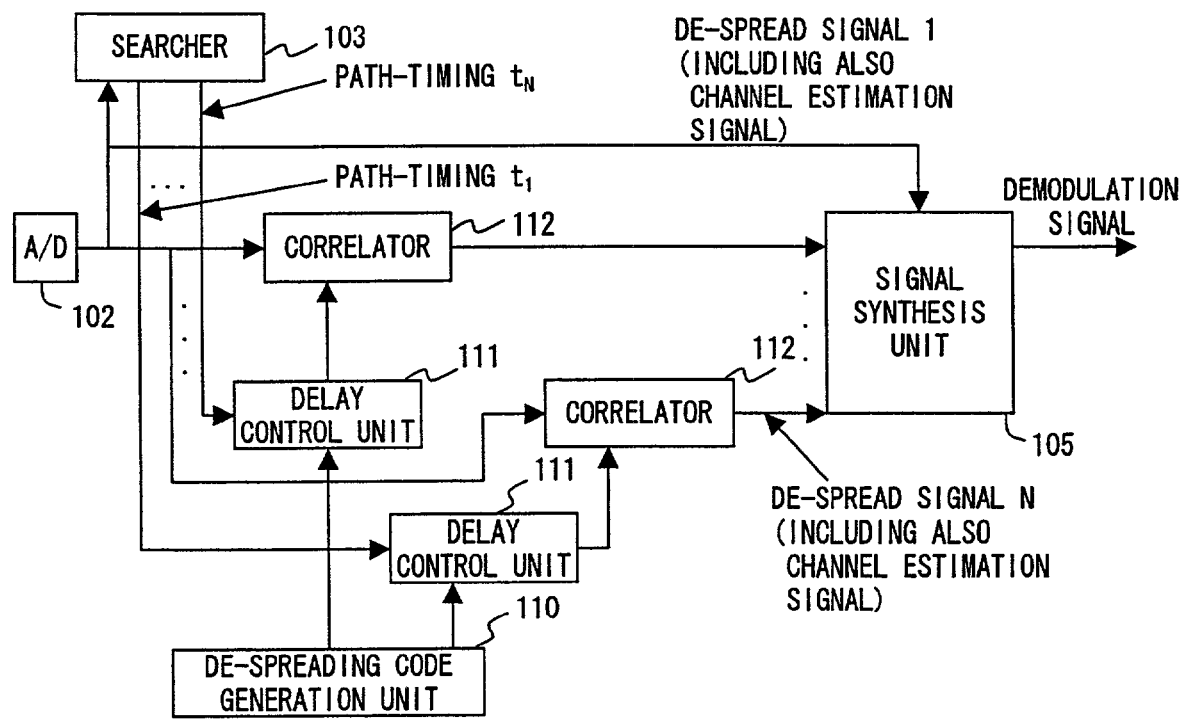
FIG. 2 is a block diagram showing the constitution of a demodulator.
Figure 3:
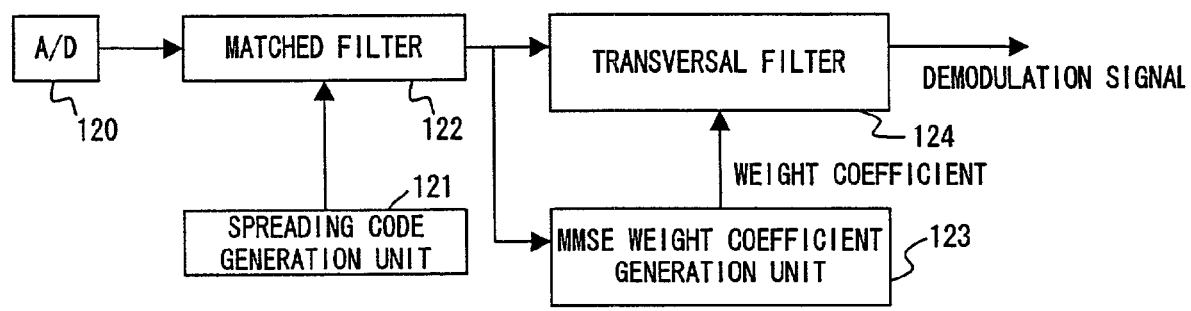
FIG. 3 is a block diagram showing the constitution example of an MMSE receiver as another constitution of a demodulator.
Figure 4:
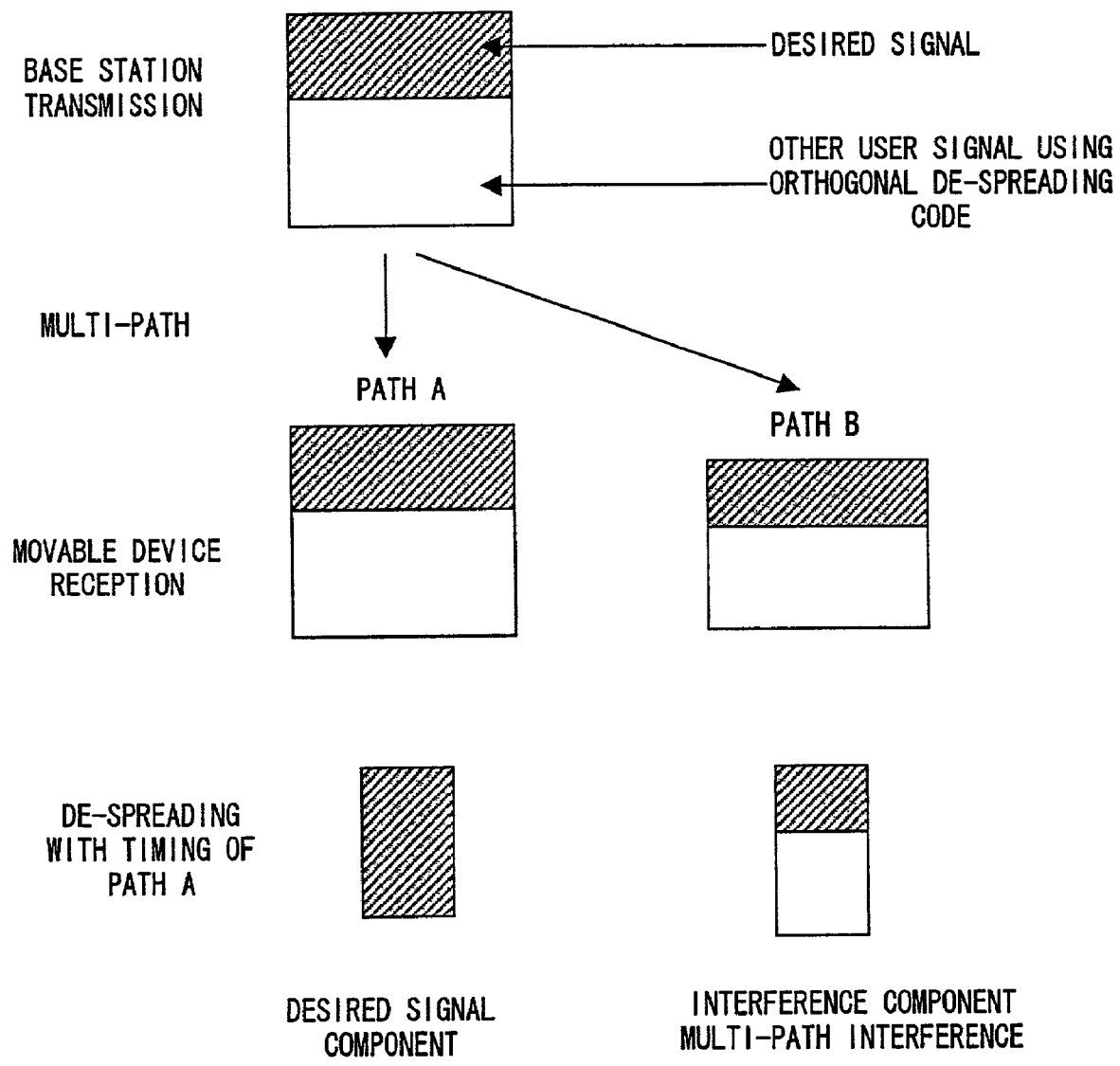
FIG. 4 explains multi-path interference.

The MMSE weight coefficient generation unit 40 generates the tap coefficient of a transversal filter as a weight coefficient in order to minimize the mean square errors of synthesis signal synthesized by the transversal filter that is explained in FIG. 3 and a known signal pattern for the channel estimation included in the output of a correlator, using a de-spread signal of the known signal. The de-spread signal of an output of the i-th correlator is obtained by the following equation (17).

$$v_i = a_k s_i + n_i \quad (17)$$

When the weight coefficient of a transversal filter is set $w_i$, the synthesis signal is obtained by the following equation (18).

$$v_k(w) = \sum_i w_i v_i \quad (18)$$

A mean square error of the synthesis signal and a known signal $a_k$ is obtained by the following equation (19).

$$f(w) = \sum_k |v_k(w) - a_k|^2 \quad (19)$$

In order to minimize this error, a weight coefficient $w_i$ is decided. As algorithm used for this decision, for example, an LMS (least Mean Square) algorithm is used.

Figure 19:
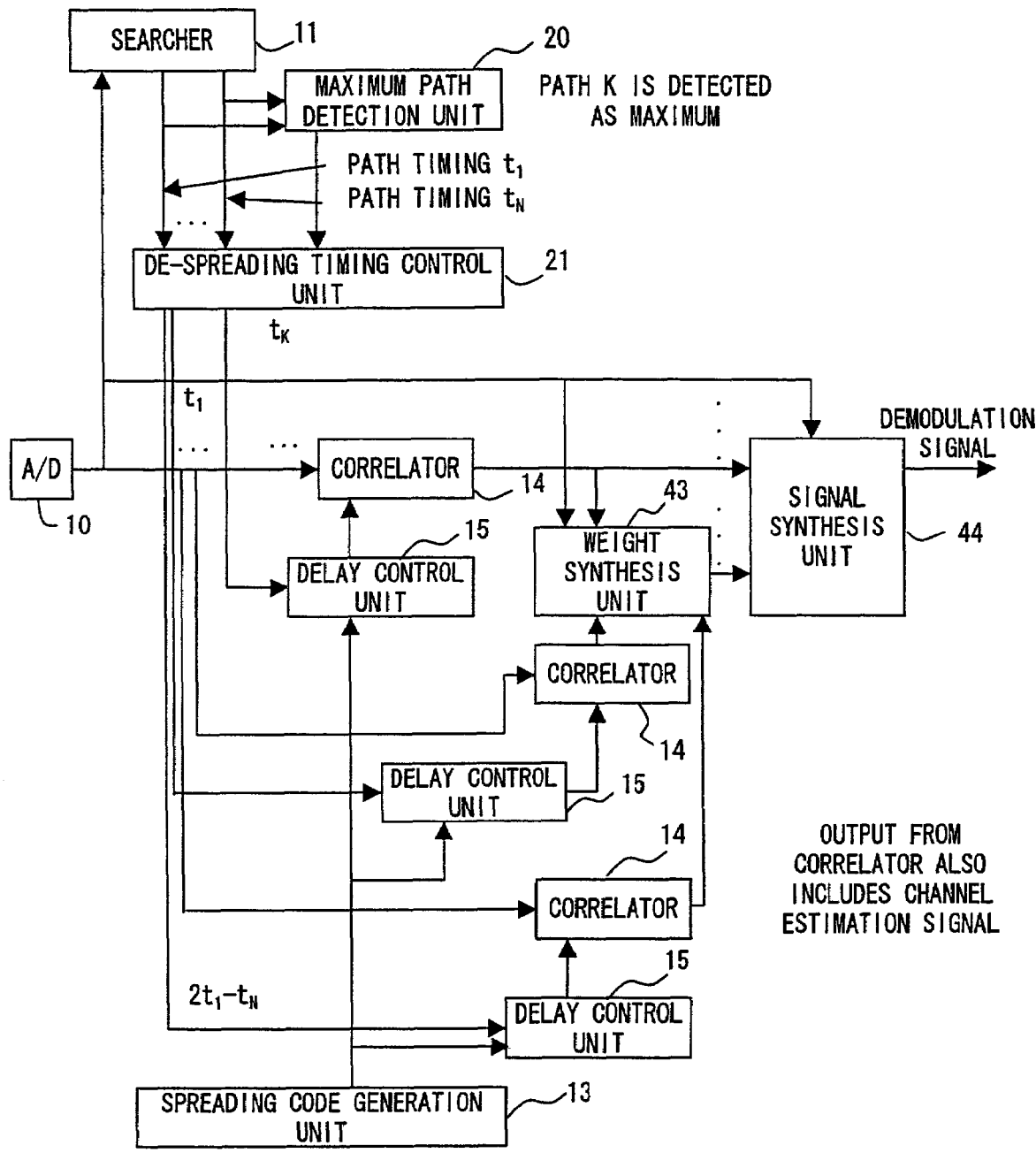
FIG. 19 is a block diagram showing the constitution of a demodulator of the seventh preferred embodiment.

FIG. 19 is a block diagram showing the constitution of a demodulator of the seventh embodiment. When the demodulator of the seventh embodiment shown in FIG. 19 is compared with the demodulator of the second embodiment shown in FIG. 11, there arises the following different point. A weight synthesis unit 43 is added before a signal synthesis unit 44 corresponding to the signal synthesis unit 16 of FIG. 11.

The seventh embodiment uses a suppression method of interference of the present invention that is explained before the explanation of the first embodiment. In other words, the following is an explanation of a method of setting a new de-spreading timing before or after the two path timings, in order to suppress the interference of the signal that is de-spread at certain two path timings, as explained using equations (1) to (10), and it is also an explanation of multiplying the new de-spreading timing by a weight coefficient used for the interference suppression, thereby adding the multiplied results of de-spread signals at every two de-spreading timings.

Also, a path of the maximum reception electric power is detected by the demodulator of the seventh embodiment in a similar manner to the demodulator of the second embodiment. Then, the interference suppression is executed by weight-adding de-spread signals for a path timing other than a path of the maximum reception electric power, for two path timings of, for example, $t_1$ and a path timing of the maximum electric power $t_k$.

According to the demodulator of the seventh embodiment, if A is a path of timing $t_1$ and B is a path of timing $t_k$, for example, in FIG. 7, a de-spreading process can be executed at timing A', that is, timing $2t_1-t_k$. However, a de-spreading process cannot be executed at de-spreading timings subsequent the path timing B, that is, timing $2t_k-t_1$. Accordingly, the weight-addition of de-spread signals is executed only for de-spread signals at timings A and A'. A de-spread signal of path timing $t_k$ is directly assigned to the signal synthesis unit 44, while only a channel estimation signal of path timing $t_k$ is assigned to the weigh synthesis unit 43.

This is because a path of the maximum reception electric power increases the interference to the other paths, while the interference to the de-spread signal of a path of the maximum reception electric power from the other paths relatively decreases. For the simplification of a circuit constitution of FIG. 19, in the seventh embodiment, de-spread signals at timings, for example, A and A' are weigh-added by the weight synthesis unit 43, a de-spread signal at the timing of path B is directly assigned to the signal synthesis unit 44, and this assigned signal is synthesized with the addition result obtained by the weigh synthesis unit 43, thereby obtaining the demodulation signal.

Figure 20:
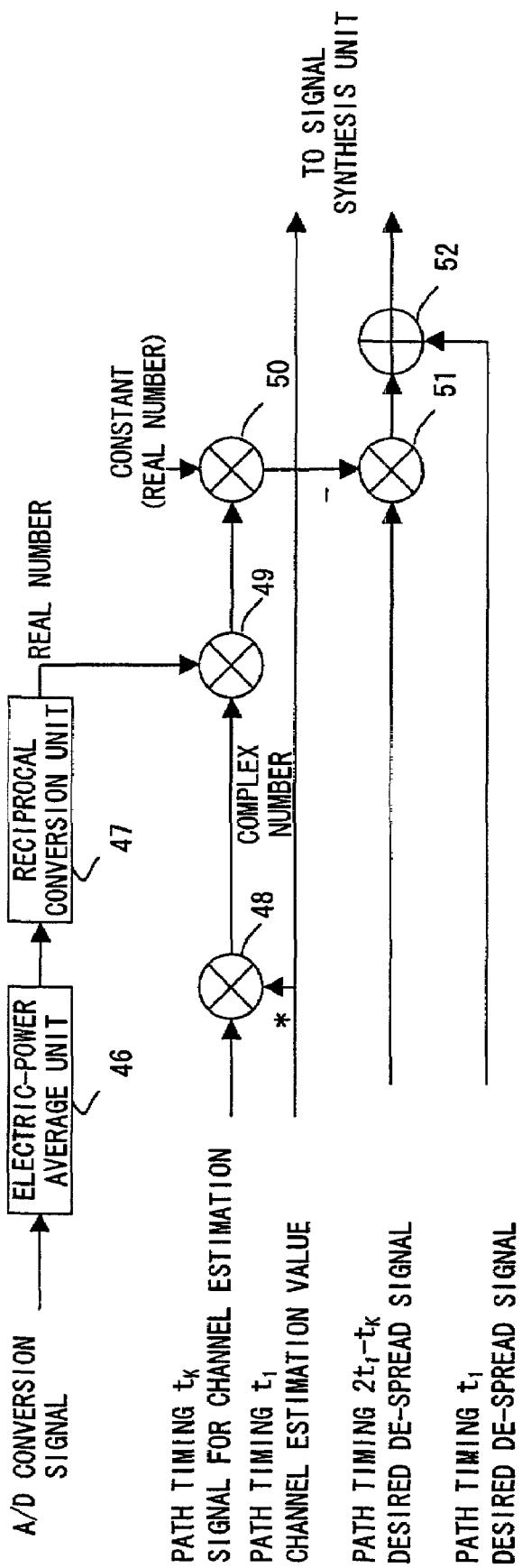
FIG. 20 is a block diagram showing the constitution of the first example of a weight synthesis unit.
Figure 21:
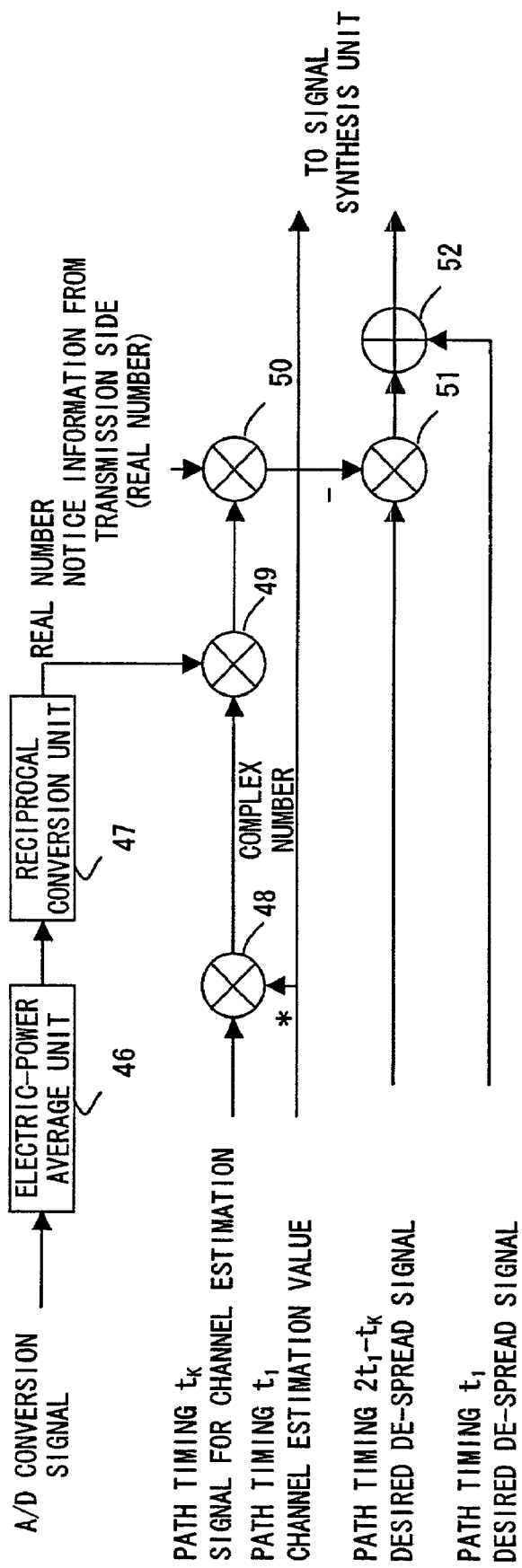
FIG. 21 is a block diagram showing the constitution of the second example of a weight synthesis unit.
Figure 22:
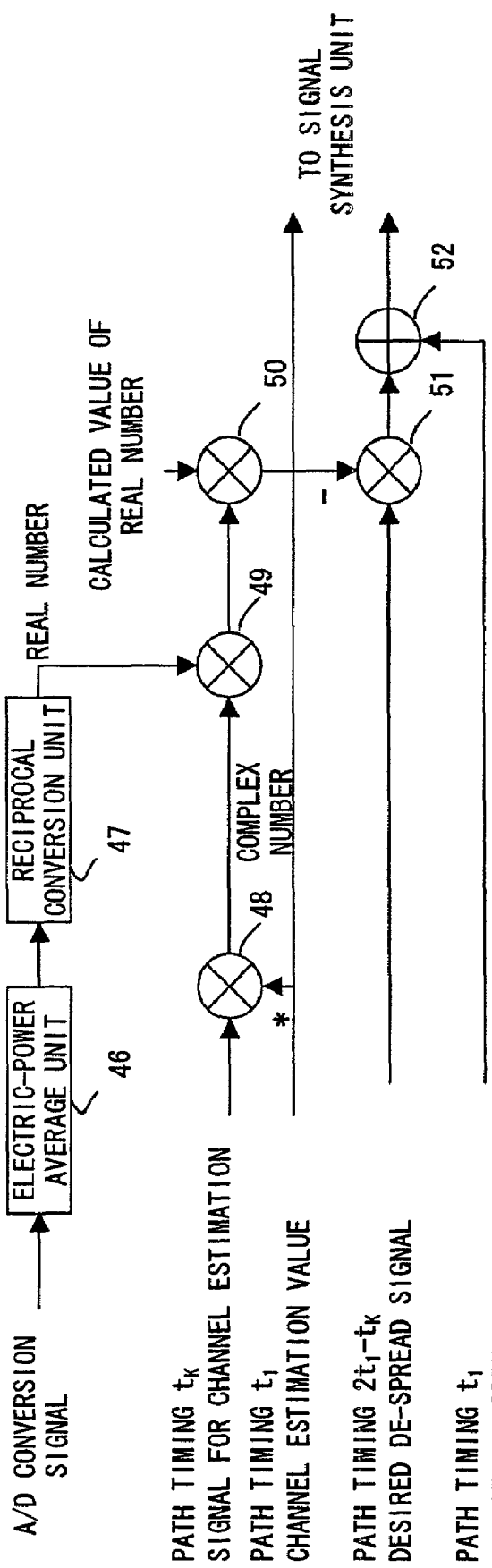
FIG. 22 is a block diagram showing the constitution of the third example of a weight synthesis unit.

FIGS. 20 to 22 illustrate the constitution of the weight synthesis unit 43 in FIG. 19. Corresponding to a set of a timing $t_k$ of a path of the maximum reception electric power and a path timing $t_1$, these drawings illustrate the constitution example of a part where the output of the correlator for outputting a desired de-spread signal at timing $2t_1-t_k$ and the output of the correlator for outputting a desired de-spread signal at timing $t_1$, are weigh-added. Therefore, (N−1) sets of such circuits exist corresponding to all N path timings.

FIG. 20 is a block diagram of a circuit corresponding to a weight coefficient of the equation (7). The denominator of the equation (7) indicates all pieces of the reception electric power, and this is equivalent to the average value obtained by an electric power average unit 46 used for an A/D conversion signal. The average value is converted to a reciprocal by a reciprocal conversion unit 47 to be input to a multiplier 49.

On the other hand, α of the molecule of the equation (7) is equivalent to a path timing $t_1$ channel estimation value. After the complex conjugate number is obtained, this number is multiplied by β, in other words, a path timing $t_k$ channel estimation value using a multiplier 48. The complex conjugate number of the multiplied result is multiplied by a real number output by the reciprocal conversion unit 47, using the multiplier 49, and this multiplied number is further multiplied by a constant that is a real number, using a multiplier 50. The code of the thus-obtained result is reversed and then assigned to a multiplier 51 as w of the equation (7).

A constant that is assigned to the multiplier 50 corresponds to the ratio of all electric power of a path to be currently de-spread to the signal electric power used for channel estimation, and it is used for amendment of electric power used for the circuit process after A/D conversion. In the seventh embodiment, channel estimation is executed by the weight synthesis unit 43.

A path timing $t_1$ desired de-spread signal is an output signal of the correlator corresponding to a de-spreading timing $t_1$, and it is equivalent to $v_A$ of the equation (1). A path timing $2t_1-t_k$ desired de-spread signal ($2t_1-t_k$ is not a path timing, but is written in this way for a matter of convenience) is the output of a correlator equivalent to a de-spreading process at this timing, and it is equal to $v_A'$ of the equation (2). As explained using the equation(3), $v_A'$ is multiplied by a weight coefficient w using the multiplier 51, and this multiplied result is added to $v_A'$ by an adder 52, thereby assigning this synthesis result to the signal synthesis unit 44 from the weight synthesis unit 43. At this time, the channel estimation value of a path timing $t_1$ is assigned to the signal synthesis unit 44.

As mentioned above, a new de-spreading timing for the interference suppression is set for the signal synthesis unit 44, between a timing $t_k$ of a path of the maximum reception electric power and an optional path timing, from among N path timings $t_1$ to $t_N$ that are detected by a searcher. Then, a de-spread signal of the new de-spreading timing and that of the optional timing are weigh-added, and N−1 synthesis results are input. At the same time, de-spread signals that are outputs of a correlator at the timing of a path of the maximum electric power, are directly input, and these input signals are synthesized, thereby outputting a demodulation signal.

FIG. 21 illustrates the constitution of the weight synthesis unit 43 in a similar fashion to FIG. 20. In FIG. 21, there is only one different point such that a constant (real number) to be assigned to the multiplier 50 is obtained as the notice information from a transmission side. FIG. 20 corresponds to a system in which the ratio of all electric power of a path to be processed to the signal electric power used for the channel estimation is, for example, a fixed value or approximately constant. Meanwhile, FIG. 21 corresponds to a case that such information is notified through a control channel from a base station side, in a movable terminal such as a cellular phone.

FIG. 21 illustrates the constitution of the weight synthesis unit 43, but there is a different point in that a constant (real number) assigned to the multiplier 50 of FIG. 20 is calculated on a receiver side.

Here, the calculation of a real number is explained as a constant on a receiver side. As mentioned above, two paths with propagation path coefficients α and β are considered, and the electric power ratio of all electric power of a path to the electric power of a signal used for channel estimation, is obtained. In this calculation, an average electric power $P_{AD}$ of an A/D transformed signal, an average electric power $P_{DS}$ of a de-spread signal for channel estimation, and an electric power $P_{CH}$ of a desired signal component, are used.

The average electric power $P_{AD}$ of an A/D converted signal is obtained by the following equation.

$$P_{AD}=(|\alpha|^2+|\beta|^2)I^2+N^2 \quad (20)$$

Here, $I_2$ indicates all electric power of a path, while $N_2$ indicates the average electric power of a noise, as explained in relation to the equation (5).

The de-spread signal used for channel estimation, in other words, electric power $P_{CH}$ of a voltage-averaged signal obtained by canceling a pilot pattern from the output of a correlator is obtained as $S^2$ that is the average electric power of a signal used for channel estimation, by the following equation.

$$P_{CH}=|\alpha|^2 S^2 \quad (21)$$

A de-spread signal for channel estimation, in other words, the average electric power of the output signals of a correlator is obtained by the following equation.

$$P_{DS}=|\alpha|^2 S^2+|\beta|^2 I^2+N^2 \quad (22)$$

In these equations, it is assumed that the amendments of a circuit computation using such as a spreading multiple has been executed. A real number to be finally calculated is $S^2/I^2$, which is obtained by the following equation.

$$\frac{S^2}{I^2} = \frac{P_{CH}}{P_{AD} - P_{DS} + P_{CH}} \quad (23)$$

Figure 23:
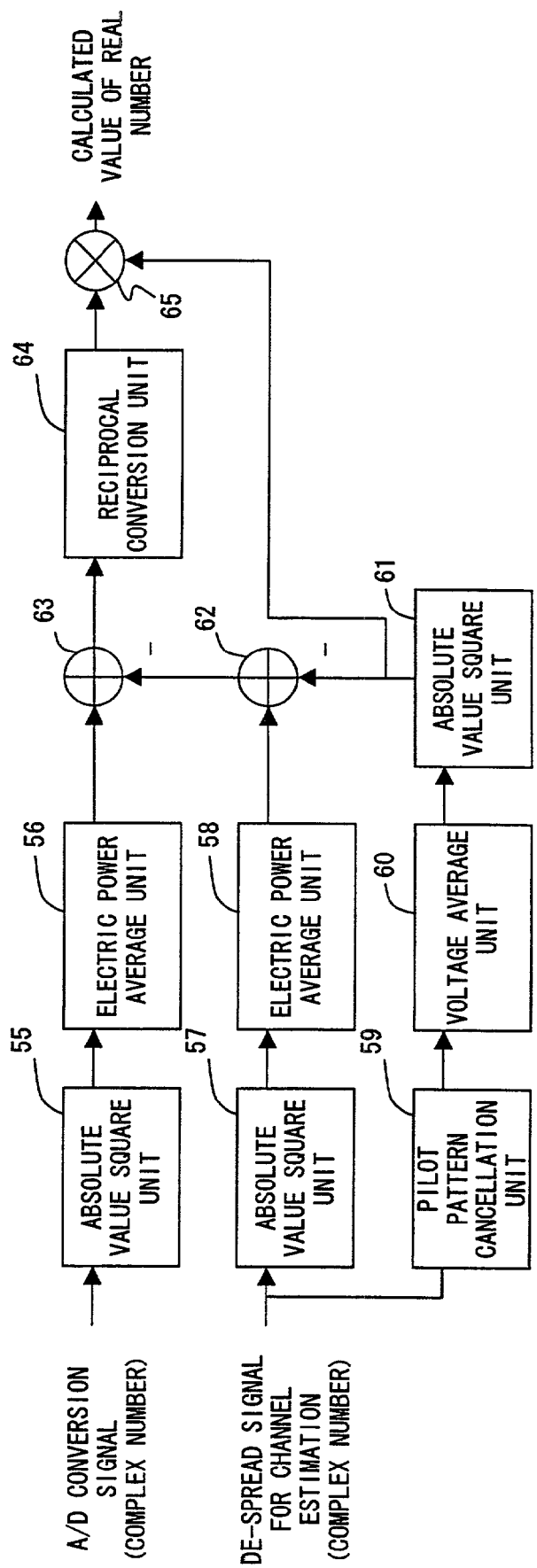
FIG. 23 is a block diagram showing the constitution of a constant calculation circuit on a receiver side.

FIG. 23 is a block diagram showing the constitution of a calculation circuit of a real numerical value as explained above. In this drawing, the square of an absolute value of the complex number that is obtained as an A/D conversion signal is calculated by an absolute square unit 55. By electric-power-averaging this square of the absolute value of the complex number using an electric power average unit 56, $P_{AD}$ is obtained as a real number.

Further, the square of an absolute value of the complex number that is obtained as a de-spread signal for channel estimation, in other words, an output of the correlator, is calculated by an absolute value square unit 57. By electric-power-averaging this square of an absolute value of the complex number using an electric power average unit 58, $P_{DS}$ is obtained as a real number.

Furthermore, a pilot pattern is cancelled by a pilot pattern cancellation unit 59, from the complex number that is obtained as a de-spread signal for channel estimation. Then, the voltage average of this result is obtained by a voltage average unit 60, and the square of an absolute value of this average voltage is obtained by an absolute value square unit 61, so that $P_{CH}$ is obtained as a real number.

Furthermore, $P_{AD}-P_{DS}+P_{CH}$ is obtained by subtracters 62 and 63, and the reciprocal of $P_{AD}-P_{DS}+P_{CH}$ is computed by a reciprocal conversion unit 64. This reciprocal is multiplied by $P_{CH}$ of the output of an absolute value square unit 61, using a multiplier 65, so that the real numerical value is calculated.

The above-mentioned is a detailed explanation of the embodiments of the present invention. In the above-mentioned, an explanation of, for example, channel estimation, takes a QPSK method as an example. However, the interference suppression method of a rake receiver of the present invention is not limited to a QPSK conversion method, but it is applicable to any conversion method if it is composed of a spectrum spreading communication system of a Direct Sequence (DS) method.

As explained in detail, the present invention can obtain a demodulation signal for suppressing the interference components included in a signal that is de-spread at the timing of a multi-path, in spectrum spreading communication under a multi-path environment. Accordingly, the signal quality of a reception signal is improved, thereby contributing to the improvement of the practicality of spectrum spreading communication.

While the invention has been described with reference to the preferred embodiments thereof, various modifications and changes may be made to those skilled in the art without departing from the true sprit and scope of the invention as defined by the claims thereof.

What is claimed is:

1. A rake receiver used in a spectrum spreading communication system, comprising:
   a path timing detection unit detecting path timings of a multi-path from reception signals;
   a de-spreading timing setting unit setting the detected path timings as de-spreading timings, wherein said de-spreading timing setting unit sets two timings in relation to a timing of a first path of a two-path pair on a time axis by setting a delay time between timings of the two-path pair while setting the timing of a second path of said two-path pair as a center such that one of said two set timings is in a symmetry across said center with said timing of the first path, for every combination of two-path pairs among said multi-path;
   a plurality of correlators respectively obtaining de-spread signals of the reception signals corresponding to the respective set timings; and
   a signal synthesis unit synthesizing outputs of the plurality of correlators.

2. The rake receiver according to claim 1, wherein the rake receiver receives a signal including a known signal from a transmission side,
   the rake receiver further comprises a weight coefficient generation unit generating a weight coefficient for signal synthesis using an algorithm for minimizing a mean square error of the known signal and a synthesized signal obtained by the signal synthesis unit, and
   the signal synthesis unit weight-synthesizes outputs of the plurality of correlators using the weight coefficient.

3. The rake receiver according to claim 1, wherein
   said de-spreading timing setting unit sets a plurality of timings that are in a vicinity of several chips of each timing as de-spreading timings in addition to path timings of the detected paths and respective two timings for each two-path pair.

4. The rake receiver according to claim 1, wherein
   said de-spreading timing setting unit sets as de-spreading timings one or more timings apart from the path timing set as the center at an interval that is obtained by multiplying an integer by more than twice the delay time in a direction opposite to the path timing of the other path in the two-path pair, in addition to path timings of the detected paths and respective two timings for each two-path pair.

5. A rake receiver used in a spectrum spreading communication system, comprising:
   a path timing detection unit detecting path timings of a multi-path from reception signals;
   a de-spreading timing setting unit setting the detected path timings as de-spreading timings, wherein said de-spreading timing setting unit sets two timings in relation to a timing of a first path of a two-path pair on a time axis by setting a delay time between timings of the two-path pair while setting the timing of a second path of said two-path pair as a center such that one of said two set timings is in a symmetry across said center with said timing of the first path, for every combination of two-path pairs among said multi-path;

a plurality of correlators respectively obtaining de-spread signals of the reception signals corresponding to the respective set timings;

a conversion matrix generation unit obtaining correlation of interference components of a de-spread signals output by the plurality of correlators and generating a conversion matrix for removing the correlation of interference components; and a signal synthesis unit synthesizing outputs of the plurality of correlators using the generated conversion matrix.

6. A rake receiver used in a spectrum spreading communication system, comprising:

a path timing detection unit detecting path timings of a multi-path from reception signals, and a path timing of a path of maximum reception electric power among the path timings of the multi-path;

a de-spreading timing setting unit setting the detected path timings as de-spreading timings, wherein said de-spreading timing setting unit sets two timings in relation to the path timing of the path of maximum reception electric power of a two-path pair on a time axis by setting a delay time between timings of the two-path pair while setting the timing of a second path of said two-path pair as a center such that one of said two set timings is in a symmetry across said center with the path timing of the path of maximum reception electric power, for every combination of two-path pairs including the path of maximum reception electric power among said multi-path;

a plurality of correlators respectively obtaining de-spread signals of the reception signals corresponding to the respective set timings; and a signal synthesis unit synthesizing outputs of the plurality of correlators.

7. A rake receiver used in a spectrum spreading communication system, comprising:

a path timing detection unit detecting path timings of a multi-path from reception signals, and a path timing of a path of maximum reception electric power among the path timings of the multi-path;

a de-spreading timing setting unit setting the detected path timings as de-spreading timings, wherein said de-spreading timing setting unit sets two timings in relation to the path timing of the path of maximum reception electric power of a two-path pair on a time axis by setting a delay time between timings of the two-path pair while setting the timing of a second path of said two-path pair as a center such that one of said two set timings is in a symmetry across said center with the path timing of the path of maximum reception electric power, for every combination of two-path pairs including the path of maximum reception electric power among said multi-path;

a plurality of correlators respectively obtaining de-spread signals of the reception signals corresponding to the respective set timings;

a weight synthesis unit executing, for all combinations, weight synthesis of outputs of two correlators corresponding to the path timing of the other path and the timing symmetric to the path timing of the other path; and a signal synthesis unit synthesizing all synthesis results obtained by the weight synthesis unit and outputs of a correlator corresponding to the path timing of the path of maximum reception electric power.

8. The rake receiver according to claim 7, wherein the weight synthesis unit further comprises a weight coefficient calculation unit calculating a weight coefficient to be multiplied by an output of the correlator corresponding to the timing symmetric to the path timing of the other path, using channel estimation values of the other path and the path of the maximum reception electric power, an A/D conversion result of the reception signal received from a transmission side, and a constant representing an electric power ratio of a channel estimation signal to a signal of one path.

9. The rake receiver according to claim 8, wherein the weight coefficient calculation unit uses a value as the constant notified from the transmission side.

10. The rake receiver according to claim 8, wherein the weight coefficient calculation unit uses as the constant a value to be calculated by using the average electric power of a signal of the A/D conversion result, the electric power of a desired signal component to be obtained by a de-spreading process, and the average electric power of a de-spread signal for channel estimation.

* * * * *